United States Patent
Hoshino et al.

(10) Patent No.: US 7,768,685 B2
(45) Date of Patent: Aug. 3, 2010

(54) HOLOGRAM OPTICAL ELEMENT AND SURFACE LIGHT SOURCE DEVICE USING THE HOLOGRAM OPTICAL ELEMENT

(75) Inventors: Tetsuya Hoshino, Tsukuba (JP); Yasushi Sugimoto, Tsukuba (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 268 days.

(21) Appl. No.: 10/555,591

(22) PCT Filed: May 7, 2004

(86) PCT No.: PCT/JP2004/006486
§ 371 (c)(1),
(2), (4) Date: Nov. 7, 2005

(87) PCT Pub. No.: WO2004/099833
PCT Pub. Date: Nov. 18, 2004

(65) Prior Publication Data
US 2007/0053030 A1    Mar. 8, 2007

(30) Foreign Application Priority Data
May 7, 2003   (JP) .............................. 2003-128929

(51) Int. Cl.
*G02B 5/32* (2006.01)
(52) U.S. Cl. ......................... 359/15; 359/569
(58) Field of Classification Search ........... None
See application file for complete search history.

(56) References Cited

U.S. PATENT DOCUMENTS 4,786,124 A  * 11/1988  Stone et al. ................. 359/15
5,589,982 A  * 12/1996  Faklis et al. ................. 359/565
2010/0020374 A1* 1/2010  Hoshino et al. ............... 359/15

(Continued)

FOREIGN PATENT DOCUMENTS

JP    05-307174    11/1993

(Continued)

OTHER PUBLICATIONS

Chinese Official Action issued Feb. 9, 2007, for No. 2004800120703.

(Continued)

*Primary Examiner*—Arnel C Lavarias
(74) *Attorney, Agent, or Firm*—Antonelli, Terry, Stout & Kraus, LLP.

(57) ABSTRACT

A hologram optical element having a thin form and a high degree of light transmittance, moreover that provides superior handling ease, as well as a surface light source device employing this hologram optical element. The angle at which light can be bent in this hologram optical element, has low wavelength dependency, and the hologram optical element enables prevention of spectral separation in white light incident from an oblique direction which is bent to a vertical direction and emitted. A transmitting diffraction grating, when light of wavelengths $\lambda 1$, $\lambda 2$ and $\lambda 3$ within the ranges $0.46 \leq \lambda 1 \leq 0.50$ μm (blue light), $0.53 \leq \lambda 2 \leq 0.57$ μm (green light), $0.60 \leq \lambda 3 \leq 0.64$ μm (red light) is incident at angle $\theta i$, the maximum diffraction angle for diffractive efficiency of each wavelength is within the range from −5 degrees to +5 degrees.

22 Claims, 15 Drawing Sheets

U.S. PATENT DOCUMENTS

2010/0027084 A1* 2/2010 Hoshino et al. ............... 359/15

FOREIGN PATENT DOCUMENTS

| JP | 06-059257 | 3/1994 |
|---|---|---|
| JP | 06-294955 | 10/1994 |
| JP | 07-028047 | 1/1995 |
| JP | 07-049490 | 2/1995 |
| JP | 07-114015 | 5/1995 |
| JP | 09-113730 | 5/1997 |
| JP | 09-325218 | 12/1997 |
| JP | 10-506500 | 6/1998 |
| JP | 10-253955 | 9/1998 |
| JP | 10-301110 | 11/1998 |
| JP | 11-064846 | 3/1999 |
| JP | 11-295713 | 10/1999 |
| JP | 11-296054 | 10/1999 |
| JP | 2000-039515 | 2/2000 |
| JP | 2000-137194 | 5/2000 |
| JP | 2002-222604 | 8/2002 |
| KR | 1998-703642 | 12/1998 |
| WO | WO 97/29398 | 8/1997 |

OTHER PUBLICATIONS

Korean Official Action issued on May 15, 2007, for Application No. 10-2005-7020883.

Iterative Methods for Diffractive Optical Elements Computation by Victor Soifer et al., US Taylor & Francis 1997 pp. 1-10.

Chinese Official Action issued Aug. 17, 2007, for Chinese Application No. 2004800120703.

Korean Official Action issued Mar. 10, 2008, for Korean Application No. 10-2005-7020883.

Chinese Official Action issued Aug. 30, 2008, for Chinese Application No. 2004800120703.

Japanese Official Action issued Oct. 21, 2008, for Japanese Application No. 2005-506042.

* cited by examiner

FIG.6
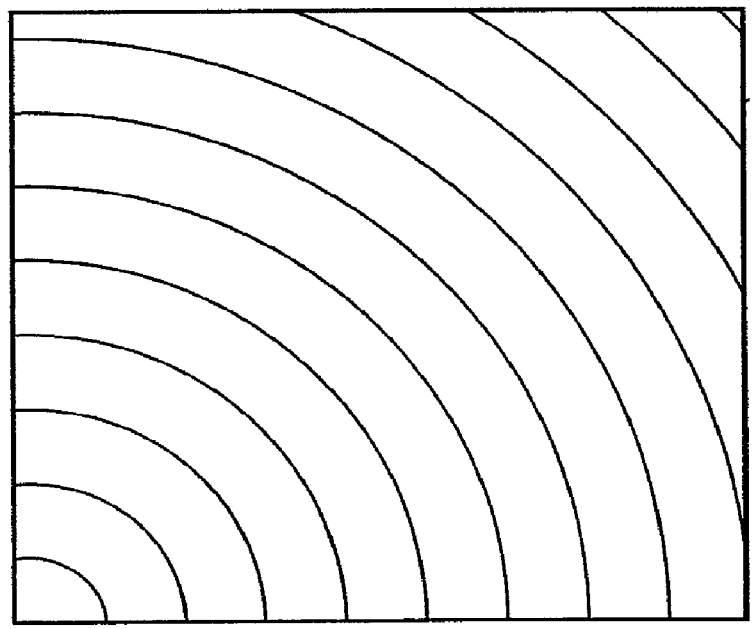
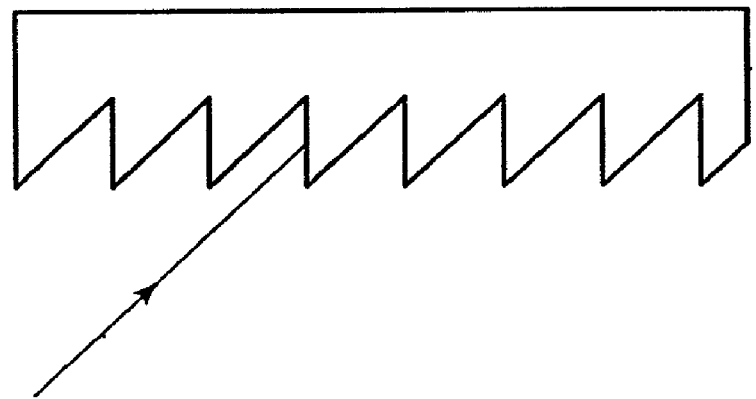

HOLOGRAM OPTICAL ELEMENT AND SURFACE LIGHT SOURCE DEVICE USING THE HOLOGRAM OPTICAL ELEMENT

TECHNICAL FIELD

The present invention relates to a hologram optical element that bends incident white light entering from an oblique direction to a vertical direction and a surface light source device that uses the hologram optical element. More specifically, the present invention relates to improving the degree of brightness in the direction in front of an observer by using the invention in a backlight of a liquid crystal display.

BACKGROUND ART

Liquid crystal displays are used as displays for computers, displays for the control panels of consumer electronic products and displays for mobile telephones. Desired improvements for liquid crystal displays include achieving lower electricity consumption, lighter weight and thinner form.

A liquid crystal display is not a self illuminating device but must use an external light source or external light from its surroundings. A typical example of an external light source is a back light arrangement whereby a surface light source is disposed at the rear surface of a liquid crystal panel. The back light system requires that light emitted from the surface light source be directed in the frontal direction to the observer.

FIG. 1 shows an example of a configuration of a backlight system. The hologram optical grating 10 is, in the conventional art, a prism sheet. Light obliquely emitted from the light guide plate 12 is bent to a vertical direction at the prism sheet, diffused, at a diffuser 32 to reduce color dispersion before being irradiated to a liquid crystal panel 30 displaying an image. In this backlight system the form of the light guide plate, and the form of the prism sheet disposed between the light guide plate and the liquid crystals are optimized such that the degree of brightness at the front is high.

FIG. 2 shows the angle of incidence θi to and the angle of emission θo from a diffraction grating, however a prism sheet is used for the purposes of the description instead. The angle of emission of light emitted from a light guide plate depends on the design of that plate, but normally the angle of incidence θi is between 20°-70°. The role of the prism sheet is to effectively bend this light such that θo is 0°, in other words, to bend the light in a vertical direction. To do this, it is necessary to reduce Fresnel reflection, that is, reflection at the interface of the atmospheric layer and the prism, and to make the greater part of the light proceed at 0°. Further, when the emitted light is of diverse angles, even if the angle of incidence θi fluctuates to some degree, by having light bending properties that ensure the degree of brightness in the vertical direction does not decrease, the degree of brightness in the frontal direction can be raised, rather than having a constant light bending angle. Moreover, as the light source is white light it is necessary to reduce bend angle wavelength dependence and suppress spectral separation as much as possible. Spectral separation causes a reduction in display qualities such as in the deterioration of color reproduction in the color display of liquid crystals.

A conventional prism sheet uses refraction and total reflection to bend emitted light using geometric optics. In contrast to this, an optical member (hologram optical element) using refraction and interference phenomena based on wave optics, realizes a plurality of functions in a single element, providing a thinner form, and furnishing superior light focus and diffusion characteristics in comparison to optical elements using geometric optics. Such hologram optical elements however, have not been used for bending white light for spectral separation or high order diffraction, but thus far have been employed for diffusing white light and broadening the viewing angle (Japanese Unexamined Patent Application Publication No. 7-114015 (pages 1-2, elected drawing), Japanese Unexamined Patent Application Publication No. 9-325218 (pages 1-2, elected drawing), Japanese Unexamined Patent Application Publication No. 10-506500 (pages 1-4, FIGS. 1-5), Japanese Unexamined Patent Application Publication No. 11-296054 (pages 1-2, FIGS. 2-5), Japanese Unexamined Patent Application Publication No. 2000-39515 (pages 1-2, FIGS. 1-2)), or for spectral separation of white light (Japanese Unexamined Patent Application Publication No. 9-113730 (pages 1-5, elected drawing), and Japanese Unexamined Patent Application Publication No. 10-301110 (pages 1-2, FIGS. 68)). Further, hologram optical elements are being used employing the effects of white light diffusion to make dot matrix display defects invisible (Japanese Unexamined Patent Application Publication No. 5-307174 (pages 1-2, elected drawing), Japanese Unexamined Patent Application Publication No. 6-59257 (pages 1-2, elected drawing), Japanese Unexamined Patent Application Publication No. 6-294955 (pages 1-2, elected drawing), Japanese Unexamined Patent Application Publication No. 7-28047 (pages 1-2, elected drawing) and Japanese Unexamined Patent Application Publication No. 7-49490 (pages 1-2, elected drawing)). For design methods for hologram optical elements please refer for example to "Iterative Methods for Diffractive Optical Elements Computation" by Victor Soifer, Victor Kotlyar and Leonid Doskolvich, US, Taylor & Francis 1997 pages 1-10.

The method of geometric optics theory systems for bending of emitted light presents a problem in that substantial height irregularities mean that sheet film thickness increases, making it difficult to achieve a thin form. Further, in the case of conventional prism sheets, individual prisms perform the function of bending light, and if there are defects on the prism or impurities, light passing that prism may engender display abnormalities such as a luminescent spot of abnormal light rays. A display device of a conventional art being extremely sensitive to defects and impurities, may give rise to display abnormalities that degrade the quality of the product. Accordingly extreme care must be taken in production and handling to ensure there are no such defects and impurities affecting a prism.

Hologram optical elements have the problems that 1) diffractive light other than that of an order of diffraction of vertically refracted incident light arises, 2) the diffractive efficiency of such an order of diffraction is low and 3) wavelength dispersion is substantial. For example if the period is small, there are orders that are not vertically diffracted and wavelength dispersion becomes substantial. If the depth is not appropriate, the diffractive efficiency of such an order of diffraction deteriorates.

With the foregoing in view it is an object of the present invention to use a hologram optical element that utilizes diffraction and interference phenomena based on the wave movement properties of light instead of a conventional prism sheet using refraction, in providing a hologram optical element and a surface light source device using the hologram element that realizes both a high rate of light transmittance in a light bending film and a thin form.

SUMMARY OF THE INVENTION

In order to achieve the above objective the present invention provides a hologram optical element having a high diffractive efficiency and low color and wavelength dispersion as well as a surface light source device using that hologram optical element, in order to bend white light emitted from the surface light source in a vertical direction.

In the hologram optical element related to this invention bend angle wavelength dependency is small, spectral separation of white light incident from an oblique direction is prevented and the white light is emitted, bent in a vertical direction.

This hologram optical element is a transmitting diffraction grating wherein, when light collimated sufficiently close to parallel light of wavelengths $\lambda1$, $\lambda2$ and $\lambda3$ within the range $0.46 \leq \lambda1 \leq 0.50$ μm, $0.53 \leq \lambda2 \leq 0.57$ μm, $0.60 \leq \lambda3 \leq 0.64$ μm is incident at angle $\theta i$, the maximum diffraction angle for diffractive efficiency of each wavelength should be within the range from −5 degrees to +5 degrees. Here, it is preferable if the condition that $\lambda1=0.48$ μm, $\lambda2=0.55$ μm and $\lambda3=0.62$ μm is used to determine the depth and period of grating.

This hologram optical element is a transmitting diffraction grating in which, when light collimated sufficiently close to parallel light of three wavelengths $\lambda1$, $\lambda2$ and $\lambda3$ that are within the range $0.46 \leq \lambda1 \leq 0.50$ μm, $0.53 \leq \lambda2 \leq 0.57$ μm, $0.60 \leq \lambda3 \leq 0.64$ μm is incident at angle $\theta i$, the maximum order of diffraction for diffractive efficiency of each wavelength is $(m+m0)$, $m$, $(m-m0)$ (provided that $m0=1, 2 \ldots$), and it is preferable that m is within the range that fulfills expression (1) and expression (2) and that the average period d fulfills expression (3). Here, it is preferable that $\lambda1=0.48$ μm, and $\lambda2=0.55$ μm and $\lambda3=0.62$ μm.

$$m \times \{\lambda2 \times (1-\sin \delta/\sin \theta i) - \lambda1\} \leq m0 \times \lambda1 \leq m \times \{\lambda2 \times (1+\sin \delta/\sin \theta i) - \lambda1\} \quad (1)$$

$$m \times \{\lambda3 - \lambda2 \times (1+\sin \delta/\sin \theta i)\} \leq m0 \times \lambda3 \leq m \times \{\lambda3 - \lambda2 \times (1-\sin \delta/\sin \theta i)\} \quad (2)$$

(Where $\delta$ is within the range, $0 \leq \delta \leq 5$ (degrees))

$$d = m \times \lambda2 / \sin \theta i \quad (3)$$

It is preferable that the hologram optical element is a grating the cross-sectional form of which is a sawtooth form, wherein the lengths of the two sides (edges) intersecting at the teeth ends differs by 10% or more, and the interior angle is equal to or below 60°.

This hologram optical element should preferably be a transmitting diffraction grating, this diffraction grating being preferably formed from material having a refractive index n, where the average depth h of the grating groove is, $h = \alpha \times d/(n-1)$ ($0.4 \leq \alpha \leq 1.0$, d being the average period of the diffraction grating).

This hologram optical element should preferably be a transmitting diffraction grating wherein the grating groove is formed as an arc shaped form.

This hologram optical element should preferably be a transmitting diffraction grating used for bending white light for which the angle of incidence $\theta i$ is in the visible regions $60° \pm 15°$, in a vertical direction, having a sawtooth form, such that when m1, m2=1, 2, 3 . . . , average period d is m1×$(6.0 \pm 2.0)$ μm, average depth h is m2×$(5.0 \pm 1.0)$ micrometers, or this sawtooth form has a surface form approximating N level (N=4, 5, 6, 7, 8, . . . ).

This hologram optical element should preferably be a film or panel shape.

This hologram optical element should preferably have a membrane having polarized light separating functionality, color separating functionality or reflection preventing functionality disposed in proximity thereto or disposed on the front and rear thereof.

This hologram optical element should preferably have the polarized light separation, color separation and reflection prevention functionality provided in the form of a grating formed in a relief form having a period equal to or below 0.6 μm and a depth equal to or below 0.5 μm.

The surface light source device related to the present invention has a hologram optical element arranged above the light emitting surface of the surface light source.

The surface light source device should preferably operate such that when the hologram optical element is not provided, the light is emitted in a range of angles from 20° to 70° in relation to the normal of the light emitting surface of the light source, and when the hologram optical element is provided, 70% or preferably more than 70% of all light emitted from the light source is emitted in a range of angles from −10° to +10° in relation to the normal of the light emitting surface of the light source.

This surface light source device should preferably employ a diffuser in addition to the hologram optical element.

This surface light source device should preferably be a hologram diffuser that diffuses incident light within a determined range of angles in space.

This surface light source device should preferably have the hologram diffuser formed as an integrated body with the light emitting surface of a light guide plate.

This surface light source device should preferably have a reflection preventing membrane arranged over the light emitting surface of the hologram optical element.

This surface light source device should preferably also simultaneously provide a film for polarized light or wavelength selection.

This surface light source device should preferably be a surface light source in which the light source is disposed in contact with the end surface at one side of a light guide plate, wherein the rear surface of the light guide plate has formed thereon a plurality of grooves, almost vertical to the inclination of light propagated in the plate.

This surface light source device should preferably have the angle of light incident to the hologram optical element in the vicinity of the Brewster angle, and polarized light of determined directions in light emitted from the hologram optical element should be strengthened.

BRIEF DESCRIPTION OF THE DRAWINGS

FIG. 6 shows a hologram optical element (diffraction grating) having a fan shaped arrangement of grooves;

BEST MODE FOR CARRYING OUT THE INVENTION

Figure 1:
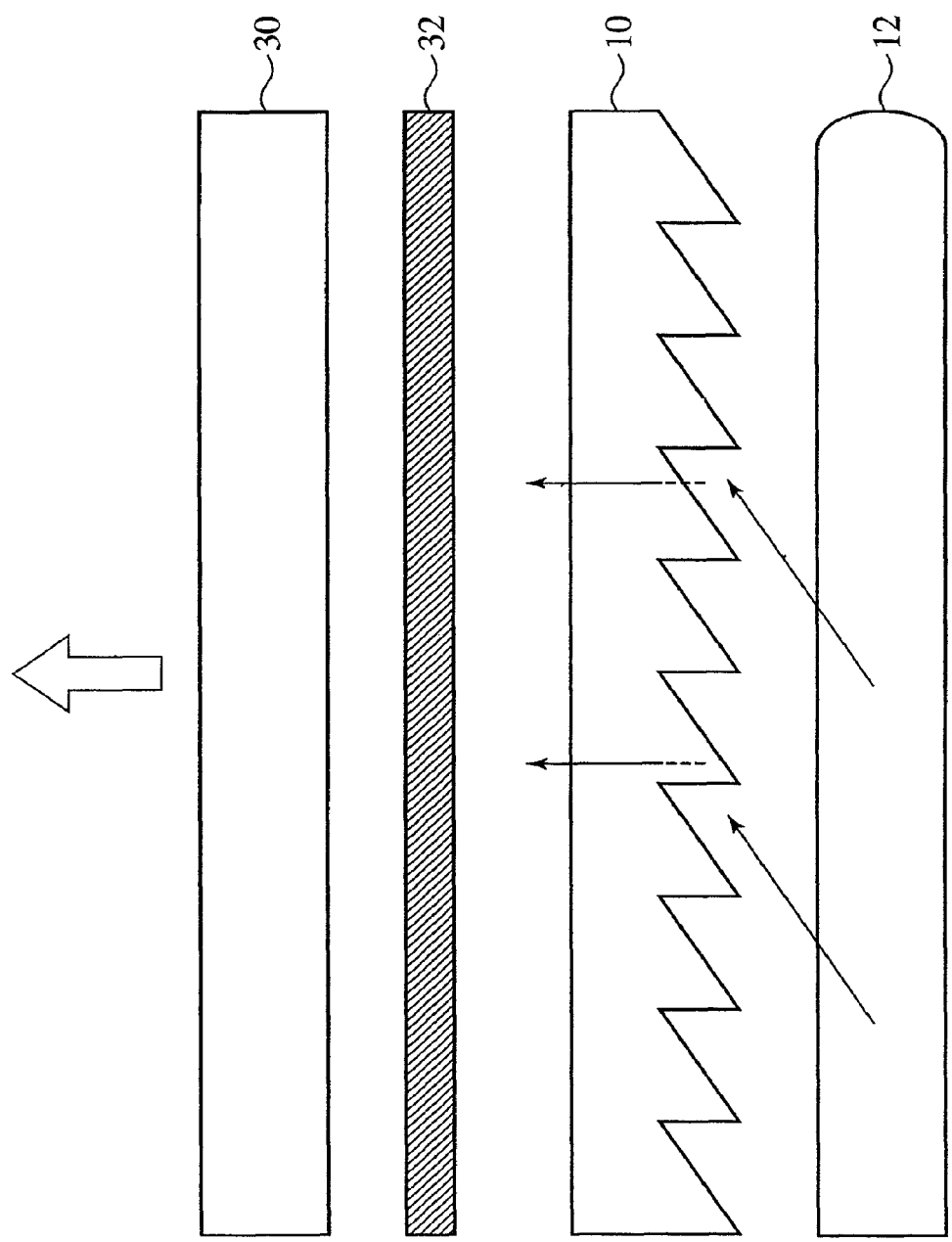
FIG. 1 shows the structure of a liquid crystal display.

The embodiments of a hologram optical element according to the present invention and a surface light source device using the hologram optical element will now be described with reference to the drawings. The described exemplary embodiments are intended to assist the understanding of the invention, and are not intended to limit the scope of the invention in any way.

The hologram optical element according to the first embodiment of the present invention is one in which bend angle wavelength dependency is small, and that operates to prevent spectral separation of white light incident from an oblique direction, and to bend that light in a vertical direction, emitting that light.

This hologram optical element controls light emission by multiple interference of diffracted light that has passed a plurality of contoured forms, wherein emission of light is not adversely affected even if one of the contours is damaged or foreign matter is present. That is to say, this hologram optical element provides superior redundancy. Accordingly, the handling and processing of this hologram optical element is easier than that required for a conventional prism sheet. Further, using this hologram optical element enables not just the bending of light, but provides additional functionalities for controlling light such as light focusing functionality and the like. The method for design of this hologram optical element can be found for example in the above cited work by Victor Soifer et al.

In the case of for example a diffraction grating type hologram optical element, generally, a grating the cross-sectional form of which is a sawtooth form, has been found to provide superior diffractive efficiency. If this form is further optimized it enables bending to be achieved while preventing spectral separation or diffusion of white light. If light in one color passes a normal hologram optical element, a plurality of diffractions known as first order light and second order light arise and light is propagated at different diffraction angles causing a decrease in light bending efficiency. Further, if white light is to be bent by diffraction, generally the angles of diffraction will be disparate due to different wavelengths causing dispersion of colors. However, it is possible to avoid these problems of reduced light bending efficiency and dispersion by achieving an appropriate design for a hologram optical element. Here, a hologram optical element refers to optical members in general that use diffraction and interference phenomena based on wave optics. Further, white light refers to light including the three primary colors, blue, green and red and bending light in the vertical direction means taking light incident to an optical member surface having diffraction and interference effects from an oblique direction, and changing that such that the direction is normal to the surface before emitting that light.

A hologram including a plurality of pixels, like a CGH (Computer Generated Hologram) is suitable for a hologram optical element according to the first embodiment. The hologram optical element can be of a surface relief type, or a volume phase type hologram, and can have the film on one surface or both, or again, the film may be layered on. Further, the hologram optical element may be transmissive or reflective. Moreover, the hologram optical element may be combined with a prism that operates based on the principles of geometrical optics.

The hologram optical element according to the second embodiment is the hologram optical element according to the first embodiment, being a transmitting diffraction grating, in which, when light collimated sufficiently close to parallel light of three wavelengths $\lambda 1$, $\lambda 2$ and $\lambda 3$ within the range $0.46 \leq \lambda 1 \leq 0.50$ μm (blue light), $0.53 \leq \lambda 2 \leq 0.57$ μm (green light), $0.60 \leq \lambda 3 \leq 0.64$ μm (red light), for example, ), $\lambda 1 = 0.48$ μm, $\lambda 2 = 0.55$ μm and $\lambda 3 = 0.62$ μm, is incident at angle $\theta i$, the maximum diffraction angle for diffractive efficiency of each wavelength is within the range from −5 degrees to +5 degrees. Such a hologram optical element basically regulates the permissible range close to the diffraction angles for wavelengths in a transmitting diffracted grating. If, when light collimated sufficiently close to parallel light of three wavelengths $\lambda 1 = 0.48$ μm, $\lambda 2 = 0.55$ μm and $\lambda 3 = 0.62$ μm corresponding to blue, green and red light is incident at angle $\theta i$, the maximum angle of diffraction for diffractive efficiency of each wavelength is included within the range from −5 degrees to +5 degrees (0 degrees is normal to the emission surface of the diffraction grating), then spectral separation of white light including wavelength components other than those three wavelengths can be prevented, and that light can be bent to a vertical direction.

The hologram optical element according to the third embodiment is the hologram optical element according to the first embodiment or the second embodiment, being a transmitting diffraction grating, in which, when light collimated sufficiently close to parallel light of three wavelengths $\lambda 1$, $\lambda 2$ and $\lambda 3$ within the range $0.46 \leq \lambda 1 \leq 0.50$ μm (blue light), $0.53 \leq \lambda 2 \leq 0.57$ μm (green light), $0.60 \leq \lambda 3 \leq 0.64$ μm (red light), for example, $\lambda 1 = 0.48$ μm, $\lambda 2 = 0.55$ μm and $\lambda 3 = 0.62$ μm, is incident at angle $\theta i$, the maximum order of diffraction for diffractive efficiency of each wavelength is (m+m0), m, (m−m0) where m is within the range that fulfills expression (1) and expression (2) and that the average period d fulfills expression (3).

$$m \times \{\lambda 2 \times (1 - \sin \delta / \sin \theta i) - \lambda 1\} \leq m0 \times \lambda 1 \leq m \times \{\lambda 2 \times (1 + \sin \delta / \sin \theta i) - \lambda 1\} \quad (1)$$

$$m \times \{\lambda 3 - \lambda 2 \times (1 + \sin \delta / \sin \theta i)\} \leq m0 \times \lambda 3 \leq m \times \{\lambda 3 - \lambda 2 \times (1 - \sin \delta / \sin \theta i)\} \quad (2)$$

(Where $\delta$ is within the range, $0 \leq \delta \leq 5$ (degrees))

$$d = m \times \lambda 2 / \sin \theta i \quad (3)$$

A concrete example of the hologram optical element according to the third embodiment that prevents spectral separation and bends white light to a vertical direction can be illustrated by these expressions. Consider a transmitting diffraction grating of average period d wherein the maximum order of diffraction for diffractive efficiency of each wavelength is (m+m0), m, (m−m0), (m0=1, 2, . . . ), when light of three wavelengths ), λ1=0.48 μm, λ2=0.55 μm and λ3=0.62 μm is incident at angle θi. Here, if the angle of diffraction of m order in relation to λ2=0.55 μm is θ2, expression (table 4) results.

$$d \times (\sin \theta i + \sin \theta 2) = m \times \lambda 2 \quad (4)$$

Thus, bending light of wavelength λ2 to a vertical direction, that is to θ2=0, requires $$d = m \times \lambda 2 / \sin \theta i \quad (5)$$

At this time, if, if the angle of diffraction of order (m+m0) in relation to λ1 is θ1, and angle of diffraction of order (m−m0) in relation to λ3 is θ3, then $$d \times (\sin \theta i + \sin \theta 1) = m \times \lambda 2 \times (1 + \sin \theta 1 / \sin \theta i) = (m+m0) \times \lambda 1 \quad (6)$$

$$d \times (\sin \theta i + \sin \theta 3) = m \times \lambda 2 \times (1 + \sin \theta 3 / \sin \theta i) = (m-m0) \times \lambda 3 \quad (7)$$

In order to prevent spectral separation, δ must be $$-\delta \leq \theta 1, \theta 3 \leq \delta \quad (8)$$

as a constant within the range 0≦δ≦5 (deg).

From expressions (6), (7) and (8), the extrapolated expressions to be fulfilled by m are $$m \times \{\lambda 2 \times (1 - \sin \delta / \sin \theta i) - \lambda 1\} \leq m 0 \times \lambda 1 \leq m \times \{\lambda 2 \times (1 + \sin \delta / \sin \theta i) - \lambda 1\} \quad (9)$$

$$m \times \{\lambda 3 - \lambda 2 \times (1 + \sin \delta / \sin \theta i)\} \leq m 0 \times \lambda 3 \leq m \times \{\lambda 3 - \lambda 2 \times (1 - \sin \delta / \sin \theta i)\} \quad (10)$$

If expressions (5), (9) and (10) are fulfilled, light of wavelengths λ1, λ2 and λ3 is diffracted within the range ±δ degrees. For example, where θi=65 degrees, m0=1, δ=1 degrees, the appropriate transmitting diffraction grating can be obtained. Here, from expressions (9) and (10), $$7.69 \leq m \leq 8.08 \quad (11)$$

thus, m=8 is the only integer that fulfills the conditions. Accordingly, from expression (5), average period d can be of approximately 4.85 μm. The appropriate cross-sectional form for the grating can be selected such that in relation to λ1=0.48 μm maximum diffractive efficiency is 9th order, in relation to λ2=0.55 μm, maximum diffractive efficiency is 8th order and in relation to λ3=0.62 μm, maximum diffractive efficiency is 7th order.

Figure 3:
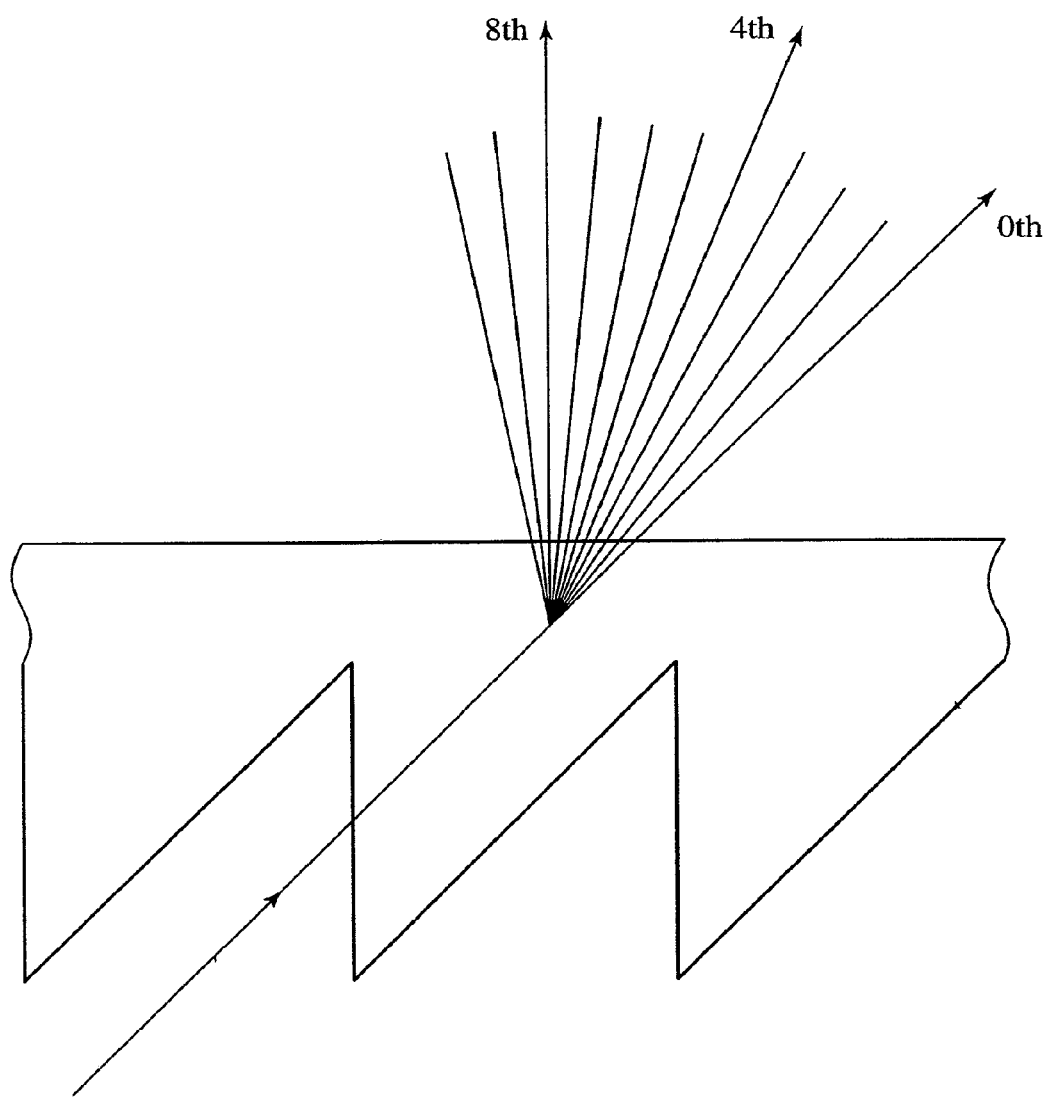
FIG. 3 shows the relationship between the order of diffraction of light diffracted and the angle of diffraction.

FIG. 3 shows the relationship between order of diffraction and angle of diffraction. Light among light emitted from a hologram optical element that propagates in the same direction as incident light is 0 order light. Light that moves in a direction approaching the normal to the exit surface is positive order diffracted light and light moving to the opposite direction is negative order diffracted light. Accordingly, light emitted in a direction normal to the exit surface is definitely positive order diffracted light.

The hologram optical element according to the fourth embodiment is the hologram optical element according to the first, second or third embodiment, being a grating the cross-sectional form of which is a sawtooth form, wherein the lengths of the two sides (edges) intersecting at the teeth ends differs by 10% or more and the interior angle is equal to or below 60°.

The hologram optical element according to the fifth embodiment is the hologram optical element according to the fourth embodiment wherein the cross-sectional form of the grating is a stair like form of N levels (N=4, 5, 6, 7, 8, . . . ).

The hologram optical elements according to the fourth and fifth embodiments have a form suitable to a cross-sectional grating form for a transmitting diffraction grating (hologram optical element) used for bending white light to a vertical direction. A form of sharp ended saw teeth or a form approaching a stair like form of N levels is suitable for efficiently bending such light to a vertical direction.

Figure 4:
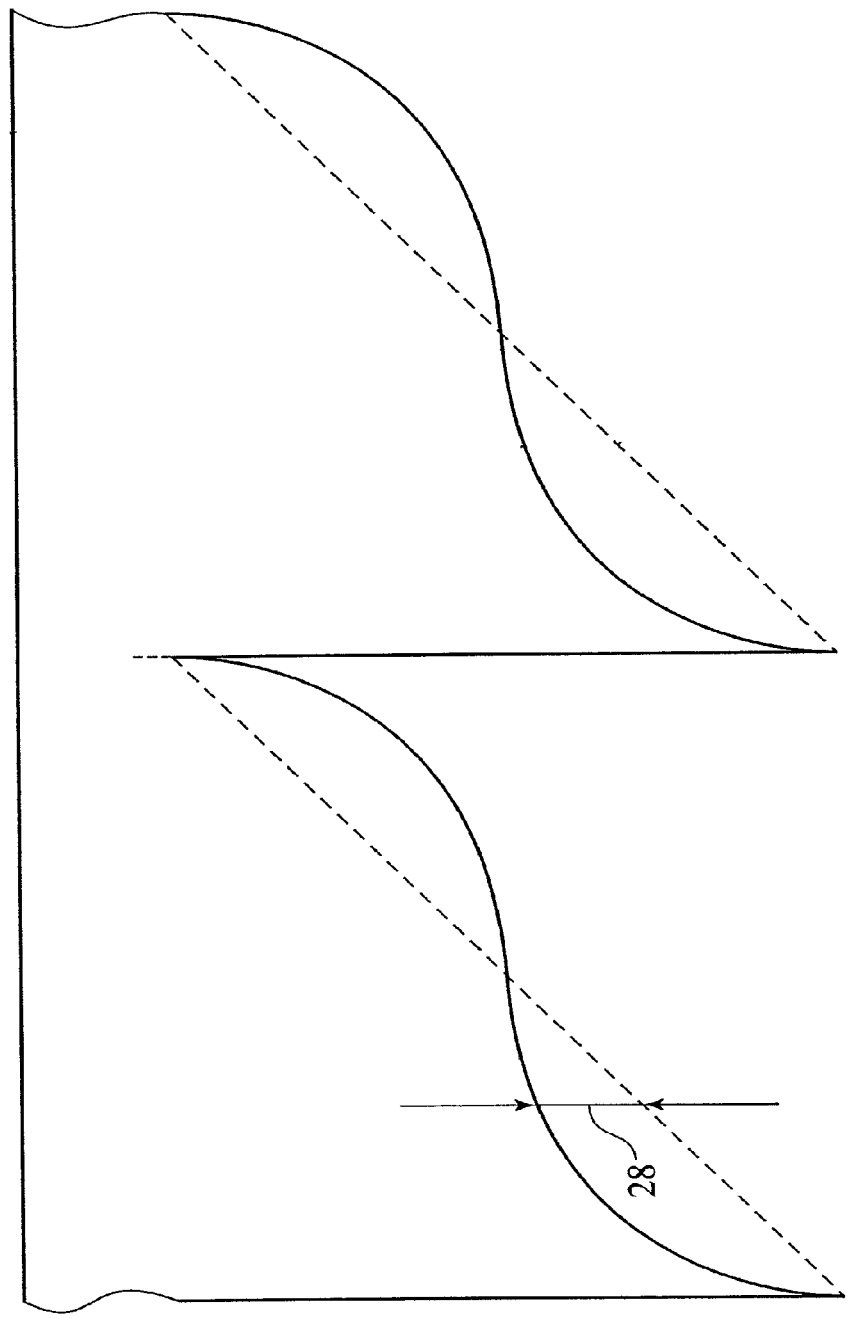
FIG. 4 shows displacement of the sawtooth form of the hologram optical element (diffraction grating)

Displacement as shown in FIG. 4, from the ideal sawtooth form, is still suitable for the cross-sectional form of the grating. Here, the maximum value for the degree of displacement (28 in FIG. 4) from a straight line should be equal to or below 0.2 μm. Depending on the conditions, diffractive efficiency may be at the maximum at points slightly shifted from the sawtooth form. The optimum grating form differs according to angle of incidence, wavelength, period, depth and index of refraction. This optimum can be worked out by calculating numerically the exact solution for diffractive efficiency in a periodic grating, using varying values in a process of trial and error.

The hologram optical element according to the sixth embodiment is a hologram optical element according to the fourth embodiment and the fifth embodiment that are transmitting diffraction gratings, wherein the diffraction grating is formed from material of refractive index n, the average depth h of the grating grooves is h=α×d/(n−1) (0.4≦α≦1.0, d is average period of the diffractive grating).

The above relational expression shows the desirable range for the depth of grating grooves in the transmitting diffraction grating (hologram optical element) used for bending white light in a vertical direction according to the sixth embodiment.

Figure 5:
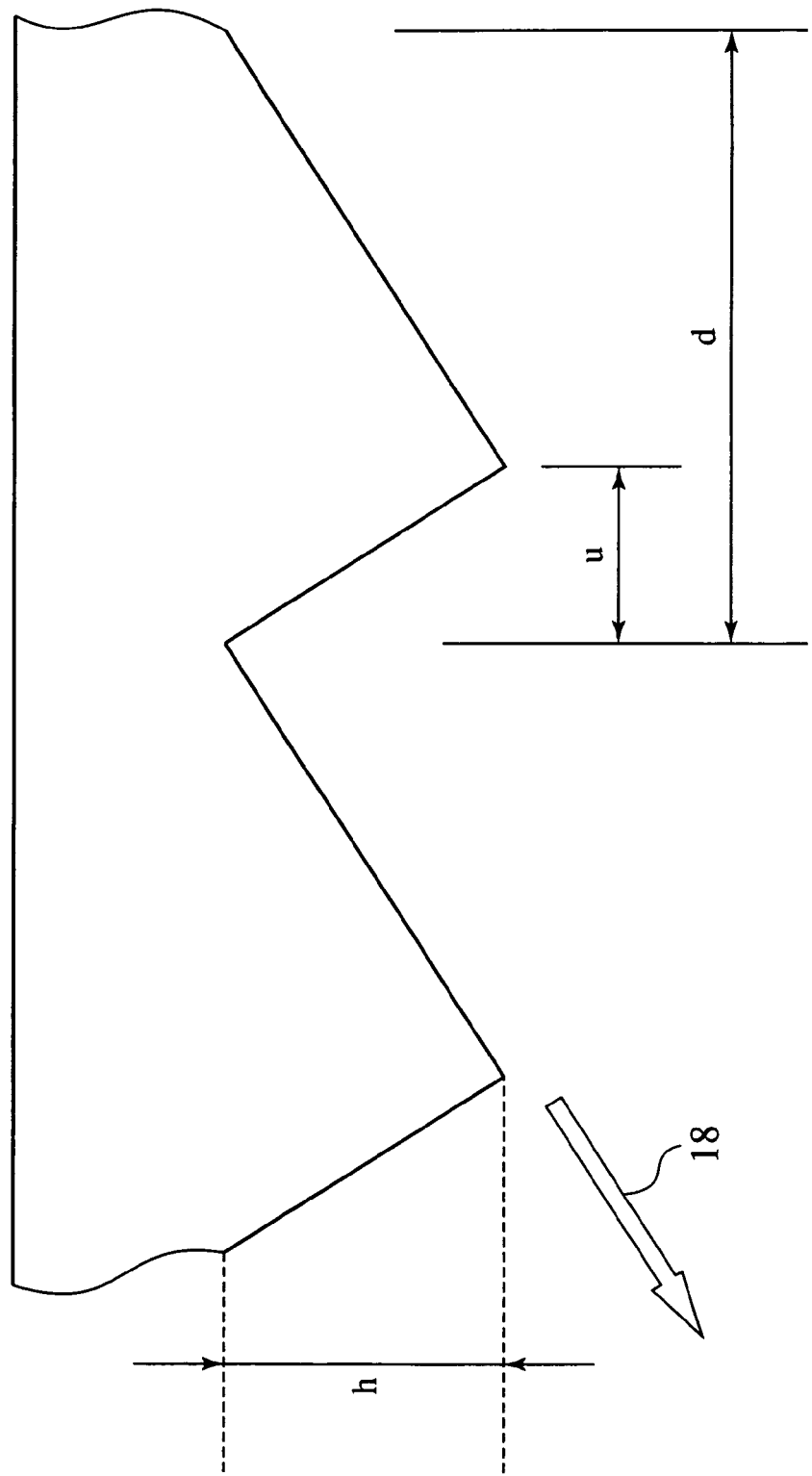
FIG. 5 depicts the sawtooth form of the hologram optical element (diffraction grating)

FIG. 5 shows the relationship between period and depth of grating grooves and sawtooth positional displacement. If the average depth h of grating grooves of the diffraction grating is deep or shallow the light reaches a vertical direction less efficiently. In this way, when the refractive index of the diffraction grating is n, the efficiency with which light reaches a vertical direction is high when the average depth h of the grating grooves is α×d/(n−1) (0.4<α<1.0). Here, the optimum depth h is dependent on period d and positional displacement of the sawtooth contours. For example, where period is 5 μm, u/d is 20%, one optimum depth is 5.5 μm. When mass producing a broad area diffraction grating having deep grooves as used here, the resin material used can be transferred from a mold. The resin thus transferred is hardened by a thermal process or UV light. Methods for producing a mold having deep grooves as used for the present invention involve excavating with RIE after applying an electron beam resist over a substrate and performing electron beam drawing, exposure and development using x-ray radiation, exposure and development of gray scale mask patterns, or a machine processing method using a cutting tool. Depending on the conditions of usage, the transferred material may be a optically curable resin, of an acrylic type with good optical transparency.

The hologram optical element according to the seventh embodiment is the hologram optical element according to any of the first to sixth embodiments, being a transmitting diffraction grating, wherein the grating grooves are arc shaped.

This hologram optical element has a grating groove arrangement for a diffraction grating suited to a back light of a type employed when an LED is installed at the corner part of a light guide plate. As the grating grooves are arc shaped, light propagated from the LED of the corner part can be efficiently bent to a vertical direction, enabling the degree of brightness in the frontal direction to be raised. As shown in FIG. 6, cross-sectionally the grating is made sawtooth shaped, it being preferable to form the grating grooves in a concentric circle form centered around a point. The grating grooves in a circular arc must form a continuous groove.

The hologram optical element according to the eighth embodiment is a hologram optical element according to any of the first to seventh embodiments, being a transmitting diffraction grating used for bending white light of a visible region in which the angle of incidence $\theta i$ is $60°±15°$, to a vertical direction, wherein when m1, m2=1, 2, 3 . . . the grating has a sawtooth form in which average period d is m1×(6.0±2.0) μm and average depth h is m2×(5.0±1.0) μm, or has a surface form in which this sawtooth shape approximates N level (N=4, 5, 6, 7, 8, . . . ).

The above relational expression shows the desirable period for a transmitting diffraction grating, grating groove depth and cross-sectional form, particularly where the angle of incidence $\theta i$ is within the range $60°±15°$.

In the case of any of the hologram optical elements according to any of the first to eighth embodiments of the present invention, the inclination of the grooves of the transmitting diffraction grating may be vertical or parallel in relation to the incident light. Further, this inclination may span lengthwise and widthwise.

Figure 2:
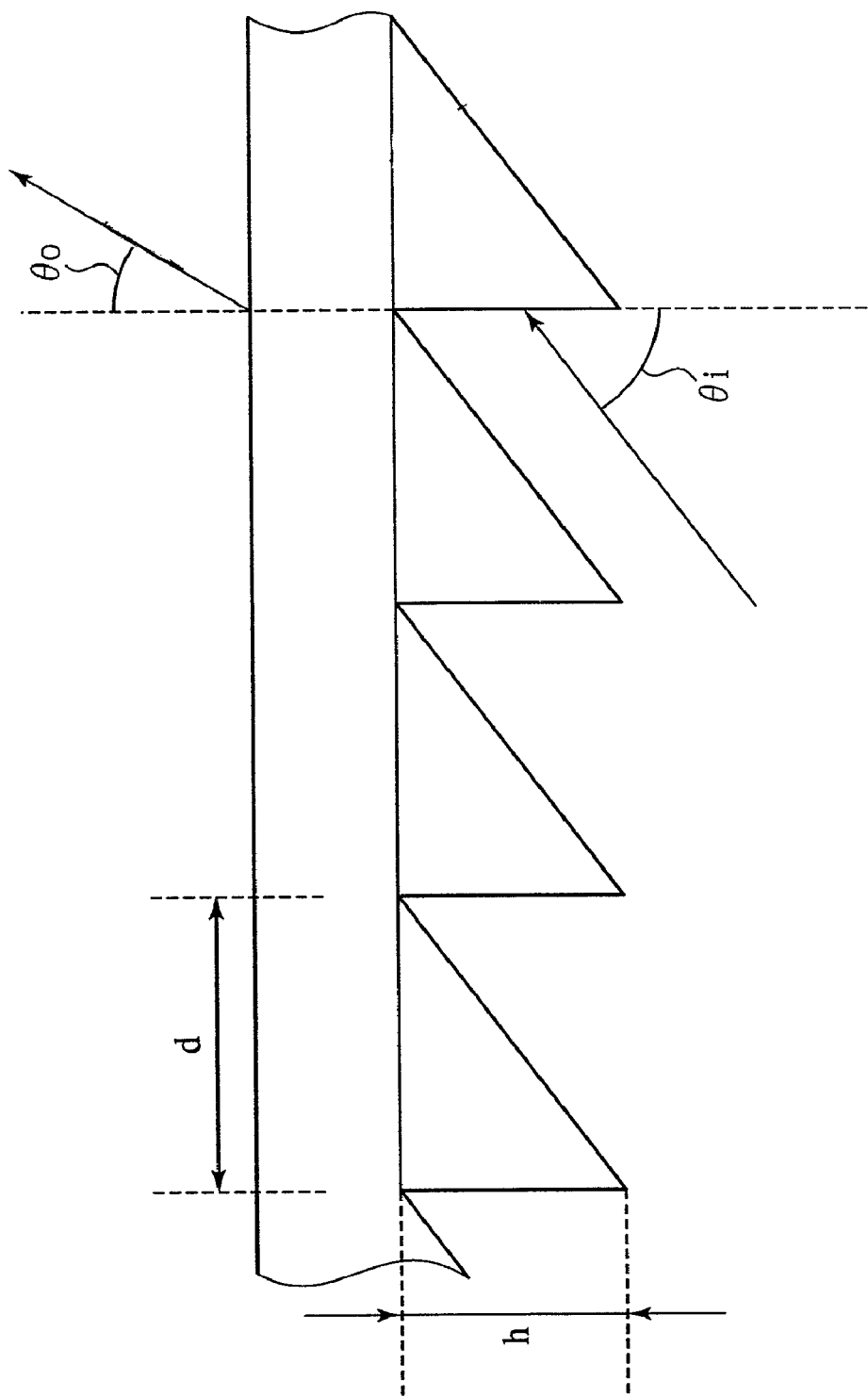
FIG. 2 illustrates the angle of incidence $\theta i$ and the angle of emission $\theta o$ of hologram optical elements (diffraction grating)

FIG. 2 shows the relationship between the angle of incidence to and the exit angle from the diffraction grating. White light including the three primary colors red, green and blue is emitted from a surface light source that radiates light in a planar aspect like a light guide plate used in a liquid crystal display. Here, depending on the design of the surface light source device, the angle resulting from the incident light and the direction normal to the plane of incidence of the diffraction grating, that is to say, the angle of incidence $\theta i$, is normally within the range of 20° to 70°. At this time, it could be said that white light passing the diffraction grating is bent to a vertical direction within a range of ±10°, that is to say, from the perspective of an observer, if more than 60% of the light is focused in the frontal direction, it could be said to be bent to a vertical direction. Further, at less than 10°, the range of wavelength dependency of the diffraction angle is small. Besides the above described wavelength dispersion it is also necessary to consider polarization dispersion. When considering orders of diffractive efficiency closest to vertical, if those having the greatest diffractive efficiency are polarization A and those having the smaller diffractive efficiency polarization B, then when (A−B)/A is 20% or below, it could be said that polarization dependency is small. When polarization dependency is 5% or above it is preferable that polarization of the higher diffractive efficiency is used at a liquid crystal display device. The diffraction grating has not only light bending functions, but can also function to focus or diffuse light, further, the surface of the diffraction grating can be formed not only as a flat surface, but in order to add additional optical functions, a curved surface may also be formed. Moreover, the diffraction grating can also be used together with a prism sheet. For example, when considering a space of x, y z-coordinates, the light can be bent in the x direction by the diffraction grating and in the y direction by the prism sheet.

The hologram optical element according to the ninth embodiment is a hologram optical element according to any of the first to eighth embodiments wherein the hologram optical element is a film or a plate.

In this way, the bulk of the hologram optical element of film or planar form is less than that of a hologram optical element of a cuboid or globe form.

The hologram optical element according to the 10th embodiment is a hologram optical element according to any of the first to ninth embodiments wherein a membrane having polarized light separation, color separation and reflection prevention functions is arranged in proximity to the hologram optical element or on both sides thereof.

The hologram optical element according to the 11th embodiment is a hologram optical element according to the 10th embodiment, wherein polarized light separation, color separation and reflection prevention functions are provided by a grating of relief form having depth of equal to or below 0.5 μm and a period of equal to or below 0.6 μm.

In this way, it is possible to achieve more efficient usage of light by combining the hologram optical element used for bending white light emitted from a surface light source in a vertical direction with polarized light separation, color separation and reflection prevention functions.

The polarized light separation, color separation and reflection prevention functions can be realized by a fine period construction.

The 12th embodiment of the present invention, is a surface light source device having a hologram optical element according to any of the first to 11th embodiments arranged over the exit surface of the surface light source.

Figure 7:
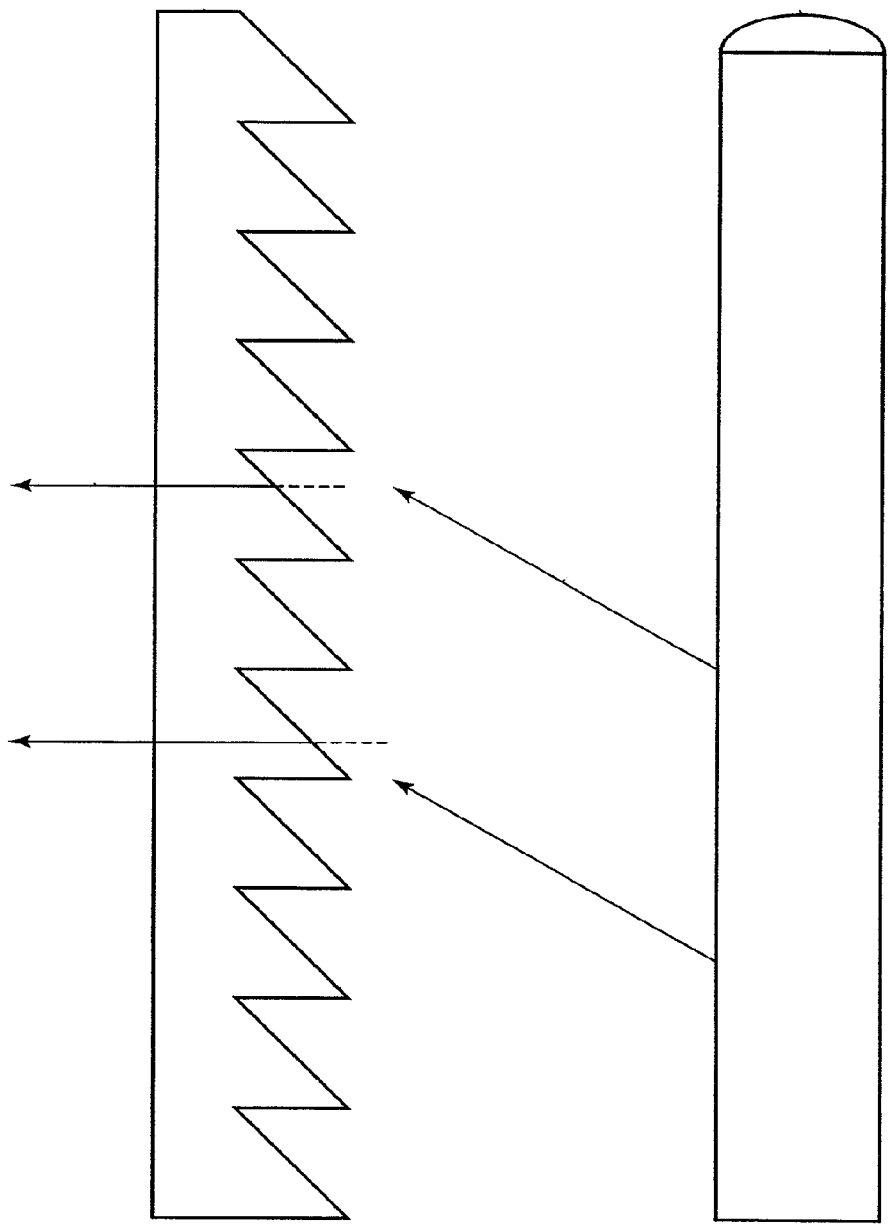
FIG. 7 illustrates how a hologram optical element (diffraction grating) bends light emitted in an oblique direction from a surface light source to a vertical direction.

The hologram optical element of this 12th embodiment bends light emitted from a surface light source in an oblique direction to a vertical direction as shown in FIG. 7. Using a hologram optical element as it is used by this 12th embodiment enables realization of a surface light source device that efficiently bends white light emitted from a surface light source, wherein the degree of brightness in the frontal direction is high and there is only a small occurrence of excess coloring due to spectral separation.

The 13th embodiment of the present invention is a surface light source device according to the 12th embodiment wherein, when the hologram optical element is not provided, light is emitted in a range of angles from 20° to 70° in relation to the normal of the exit surface of the light source and when the hologram optical element is provided more than 60% of total light emitted from the surface light source and preferably more than 70%, is emitted in a range of angles from −10° to +10° in relation to the normal of the exit surface of the light source.

Preferably, when the cross-sectional form of the grating of the hologram optical element is a transmitting diffraction grating having a sawtooth form, light emitted from the surface light source should be largely parallel to the direction following the longer side of the saw teeth shown in 18 of FIG. 5, and diffractive efficiency should be high with regards to light incident to the diffraction grating.

Further, normally, if light enters from or is emitted from a direction oblique to a membrane there is a substantial Fresnel loss. Accordingly, directing a grating surface having a sawtooth form toward a surface light source results in less Fresnel loss than the opposite arrangement. Further, if the grating is a planar shape grating, Fresnel loss can be reduced as emitted light exits at a direction vertical to the surface.

The 13th embodiment realizes a surface light source device for a backlight, wherein as more than 60% and preferably 70% of light is emitted within a range of angles of −10° to +10°, the degree of brightness in the frontal direction of the liquid crystal display device is high, moreover, a high-quality display with little spectral separation is achieved.

The 14th embodiment of the present invention is a surface light source device according to the 12th embodiment or the 13th embodiment which uses a diffuser in addition to the hologram optical element.

Figure 8:
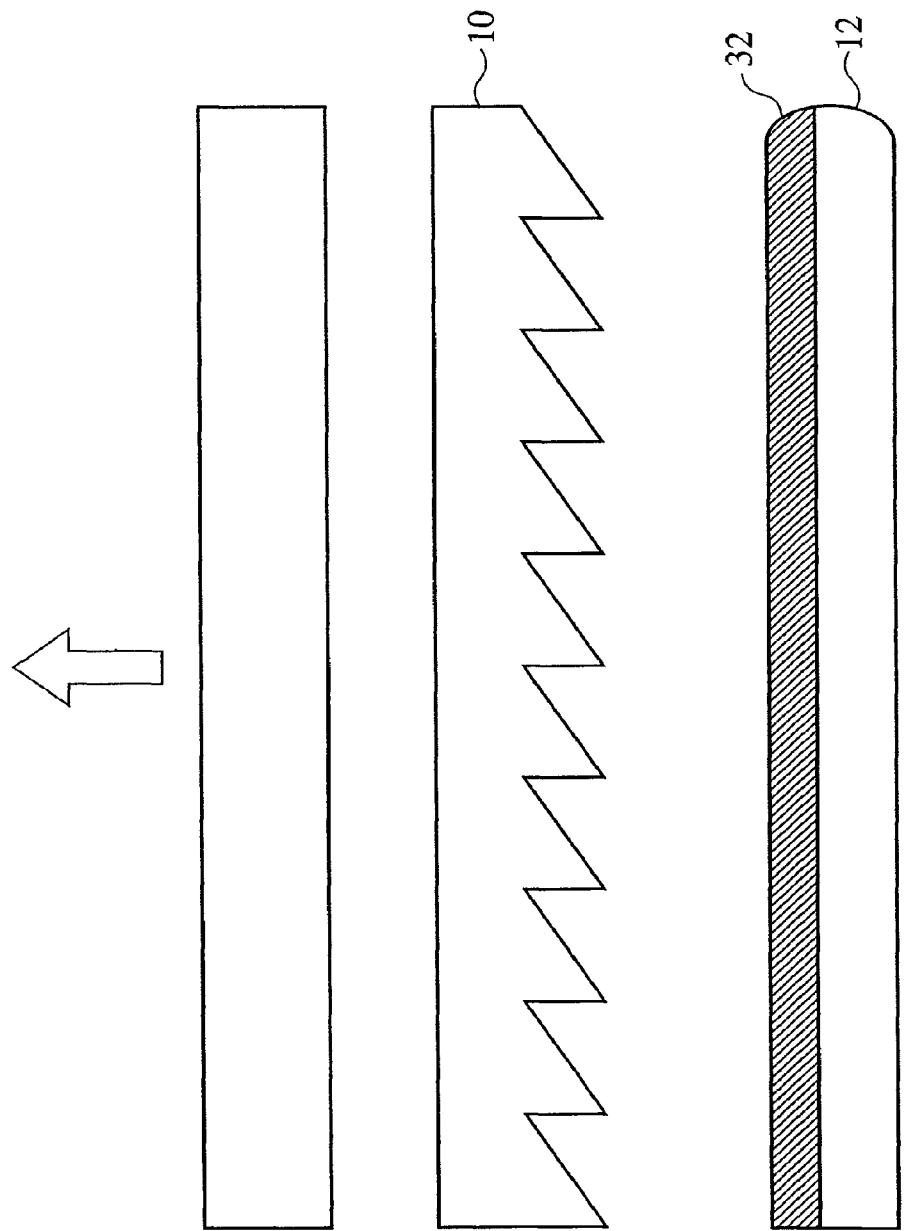
FIG. 8 shows the structure of a liquid crystal display.

As a slight degree of chromatic dispersion is apparent to the human eye, the usage of a diffuser can be beneficial. A method for combining a diff-user with a hologram optical element can be found in Japanese Unpublished Patent Application No. 2002-23797 by the same inventor as the present invention. The combination of the hologram optical element and the diffuser may involve disposal of the respective members on each side of a single film or may be provided in an arrangement of two diffraction gratings and a single diffuser. The arrangement shown in FIG. 1 having a light guide plate 12, a hologram optical element 10 and diff-user 32 arranged in succession, or the arrangement shown in FIG. 8 wherein the light guide plate 12, diffuser 32 and hologram optical element 10 are arranged in that order is also suitable. Further, the configuration of light guide plate, diffuser, hologram optical element and then diffuser is also suitable. The diffusion effect from the diffuser may be due to the ruggedness on the surface or refractive index distribution inside the film.

The 15th embodiment of the present invention is a surface light source device according to the 14th embodiment, being a device wherein a hologram diffuser diffuses incident light limited within a range of determined angles in space.

Figure 9:
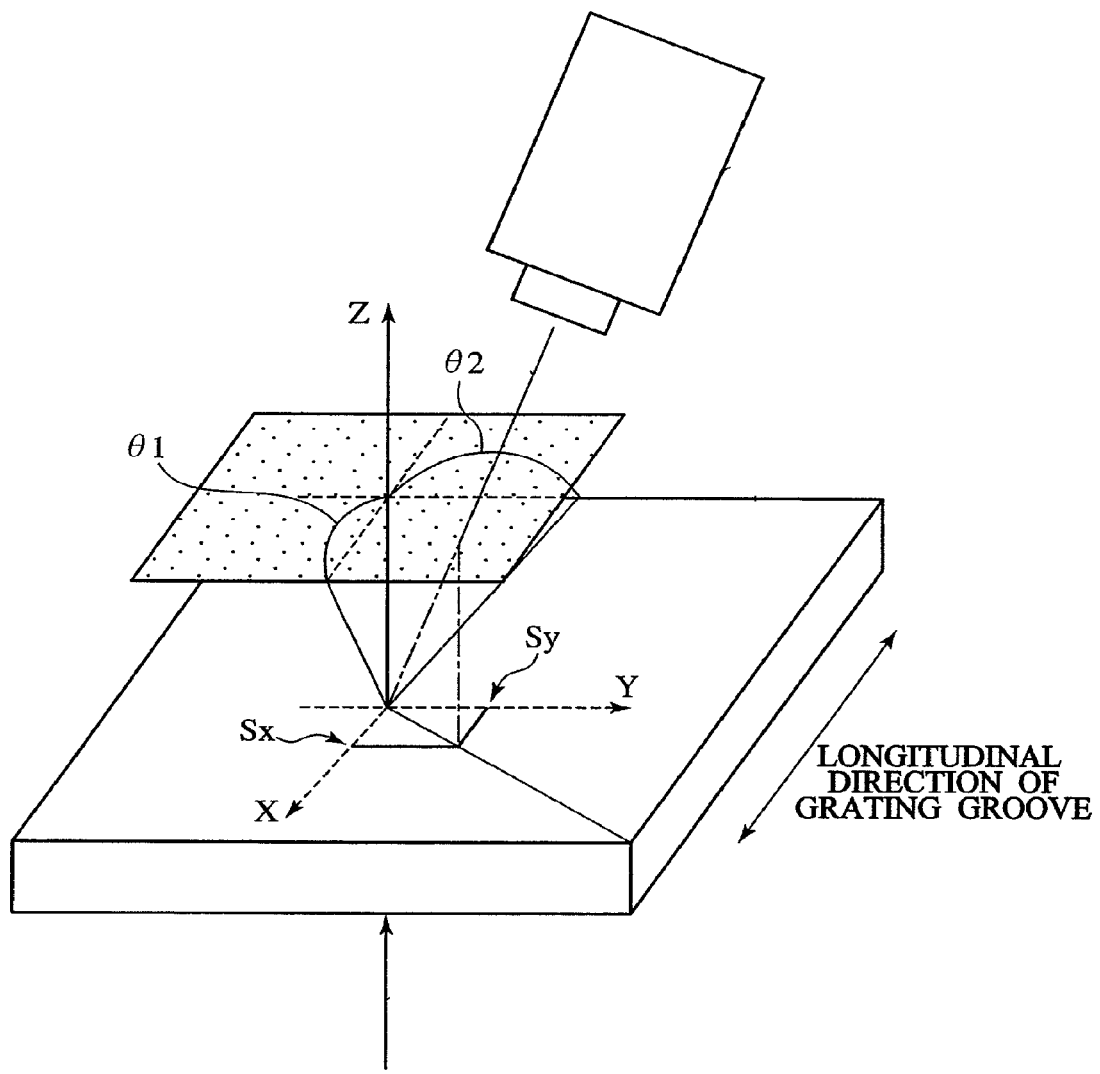
FIG. 9 illustrates a method for measuring and a method for regulating diffusion properties of a transmitting hologram diffuser.

Thus, a hologram diffuser that regulates the angle of diffusion and achieves a high degree of diffusion efficiency provides a suitable diffuser. When light is propagated in the z direction, the inclination parallel to the grooves of the grating is the x direction. The directions of dispersal of light from the diffuser can be defined as unit vectors (Sx, Sy, Sz) as shown in FIG. 9. Moreover, the maximum values for Sx and Sy are respectively, $\sin(\theta 1)$ and $\sin(\theta 2)$. Here, chromatic dispersion arises in the y direction, thus the range of $\theta 1$ should be appropriately small and the range of $\theta 2$ should be set at the minimum angle necessary to eradicate chromatic dispersion. A method for producing this kind of hologram diffuser can be obtained by employing the method disclosed in the embodiments of Japanese Unexamined Patent Application Publication No. 2002-71959. The hologram diffuser may be a surface relief type or a volume phase type. Further, the diffusion properties of the hologram diffuser may vary in different locations.

The 16th embodiment of the present invention is a surface light source device according to the 15th embodiment wherein the hologram diffuser is integrally formed with the light exit surface of a light guide plate.

When the order of arrangement used is, light guide plate, hologram diffuser, hologram optical element, Fresnel loss can be reduced by formation of the hologram optical element integrally with the exit surface of the light guide plate.

The 17th embodiment of the present invention is a surface light source device according to any of the 12th to 16th embodiments, wherein a reflection preventing membrane is arranged over the exit surface of the hologram optical element.

Light emitted from the light source is bent by a film having a relief form and emitted in a vertical direction, from the opposite side of the film. At that point when the light passes the boundary between the atmosphere and the film approximately 4% Fresnel reflection occurs. It is suitable to provide this reflection preventing membrane (nonreflective membrane) in order to prevent this. The reflection preventative function can be realized by producing a reflection preventing membrane from multilayers of a dielectric material membrane. A method for producing a reflection preventing membrane from multilayers of a dielectric material membrane is recorded for example in "Thin Optical Membranes, 2nd edition", edited by Shirou FUJIMOTO, written by Kouzou ISHIGURO and Hidetsugu YOKOTA, published by Kyoritsu Publishing Company, 1984, pages 98-109. Further, this functionality can be realized by providing a grating having a short period. Preferably, this period should be $0.28 \pm 0.08$ μm, while the depth of the grating grooves should preferably be $0.22 \pm 0.1$ μm. Again, in order to reduce the boundary between the film and the atmosphere to minimize Fresnel loss, it is preferable that the light bending relief form and short period grating are disposed on the front and rear surfaces of the same film respectively. Moreover, a plurality of layers of this film can be provided. Also, the surface from which light exits from the light guide plate can be provided with a diff-user or reflection preventing membrane.

The 18th embodiment according to the present invention is a surface light source device according to any of the 12th to 17th embodiments wherein a polarized light or light length selection film is also provided.

Providing a film for polarized light or light length selection provides improved light usage efficiency. For example, for light emitted from a surface light source of a light guide plate incident to the film at approximately an angle of incidence of 60°, where the relief form has a depth of equal to or below 0.5 μm and a period of equal to or below 0.6 μm, only light of specific wavelengths and polarization is reflected at an efficiency of above 80% while the remainder is passed at efficiency of 80%. Here, the optimum relief form is selected in accordance with wavelength and angle of incidence. If the reflected light is reused the light usage efficiency can be improved. For example, a liquid crystal display device in which the usage rate of loss light at the polarization film or color filter is improved, can be achieved by combining a relief form with a depth of equal to or below 0.5 μm and a period of equal to or below 0.6 μm with a color filter red green and blue matrix, designing the period and depth, combining this with a film that bends light in a vertical direction, and positioning the matrix. The reason for this is that one of the polarized lights at the light polarizing film, that is to say, 50% of the quantity of light is lost, while two of the three colors at the color filter, that is to say, 67% of the quantity of light is lost, however if some colors only of some polarizations are passed and the returning light is reused, it becomes possible to substantially increase the usage efficiency of the light. Further, a relief form that bends light and a small, submicron period grating should preferably be disposed on the respective sides of the same film in order to reduce Fresnel reflection between the atmosphere and film boundary. Again, a plurality of layers of the small, submicron period grating can be provided. Also, it is preferable to provide a diffuser or reflection preventing membrane on the light exit surface of the light guide plate comprising the light generating layer of the surface light source.

The 19th embodiment according to the present invention is a surface light source device according to any of the 12th to 18th embodiments, that is a surface light source having the light source disposed in contact with the end surface at one side of a light guide plate, and the rear surface of the light guide plate has formed thereon a plurality of grooves, almost vertical to the inclination of light propagated in the plate.

Figure 10:
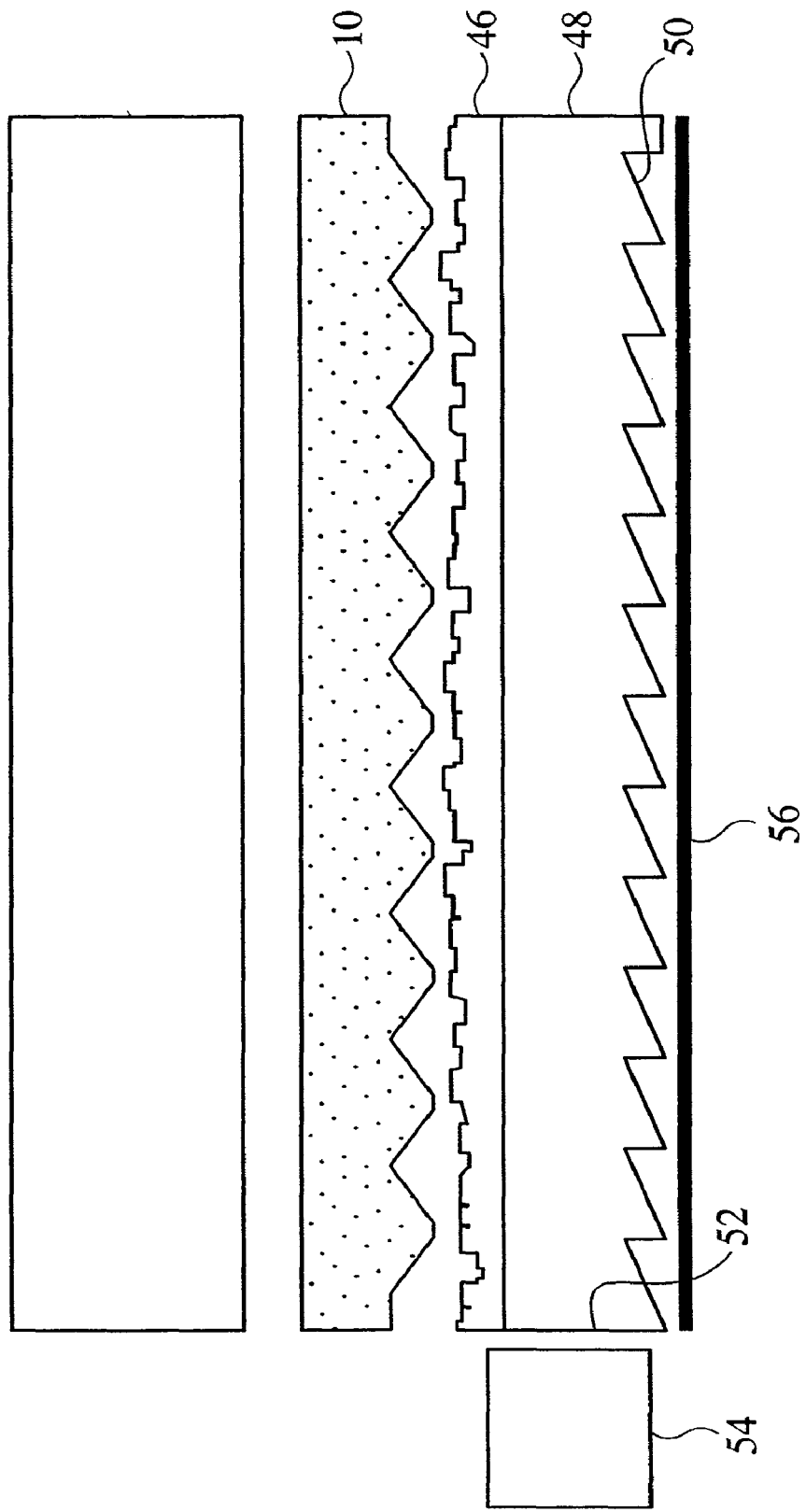
FIG. 10 shows the structure of a liquid crystal display.

In FIG. 10, light incident from the end surface on the left is reflected at the rear surface 50 of the light guide plate, is next diff-used at a diffuser 46 on the surface of the light guide plate, and is bent by a hologram optical element (light bending film) such as a diffraction grating or the like. With this kind of arrangement, the degree of brightness in a vertical direction can be improved by optimum adjustment of the angle of reflection from the rear surface of the light guide plate and the angle of diffusion at the surface of the light guide plate as well as the bending angle of the hologram optical element (light bending film).

The 20th embodiment according to the present invention is a surface light source device according to any of the 12th to 19th embodiments wherein the angle of light incident to the hologram optical element is in the vicinity of the Brewster angle, and polarized light of determined directions in light emitted from the hologram optical element is strengthened.

Where n1 and n0 are respectively the indexes of refraction of the film and the atmosphere, the Brewster $\theta_B$ when light is incident to the film is defined by expression (12).

$$\tan(\theta_B) = n1/n0 \quad (12)$$

If light is incident at the Brewster angle, light elements the direction of oscillations of the electric field vectors of which are vertical to the plane of incidence are passed, thus if this polarized light (P polarized light) is selected, a 100% pass efficiency at the boundary can be achieved. Further, a hologram optical element also is polarized light dependent. Normally, the inclination of polarized light having a high pass efficiency in relation to a flat surface is the same as that of polarized light having a high pass efficiency at a hologram optical element. Accordingly, by making the angle of incidence of light incident to the hologram optical element in the vicinity of the Brewster angle, the strength of P polarized light is increased in light emitted from the surface light source device. In this case, by combination with a liquid display panel using P polarized light, the degree of brightness in the frontal direction can be increased.

Embodiments

FIG. 10 shows the backlight structure using the light guide plate 48 related to several embodiments of the present invention. This backlight structure is like that used in a compact liquid crystal display device such as in a mobile telephone or the like. The backlight comprises, from the bottom of the drawing upward, a reflective panel 56, light guide plate 48, hologram diffuser 46 and hologram optical element (light bending diffraction grating) 10, the light guide plate 48 being formed as an integrated body with the hologram diffuser panel 46. An LED light source 54 is disposed at that side of the light guide plate 48 at which the light incidence end face 52 is provided. According to this construction, light generated from the LED light source 54 enters the light incidence end face 52 of the light guide plate 48 and after being reflected a number of times at a reflective groove formed in the rear surface 50 of the light guide plate, this light exits from the hologram diffuser 46 formed on the exit surface.

Figure 11:
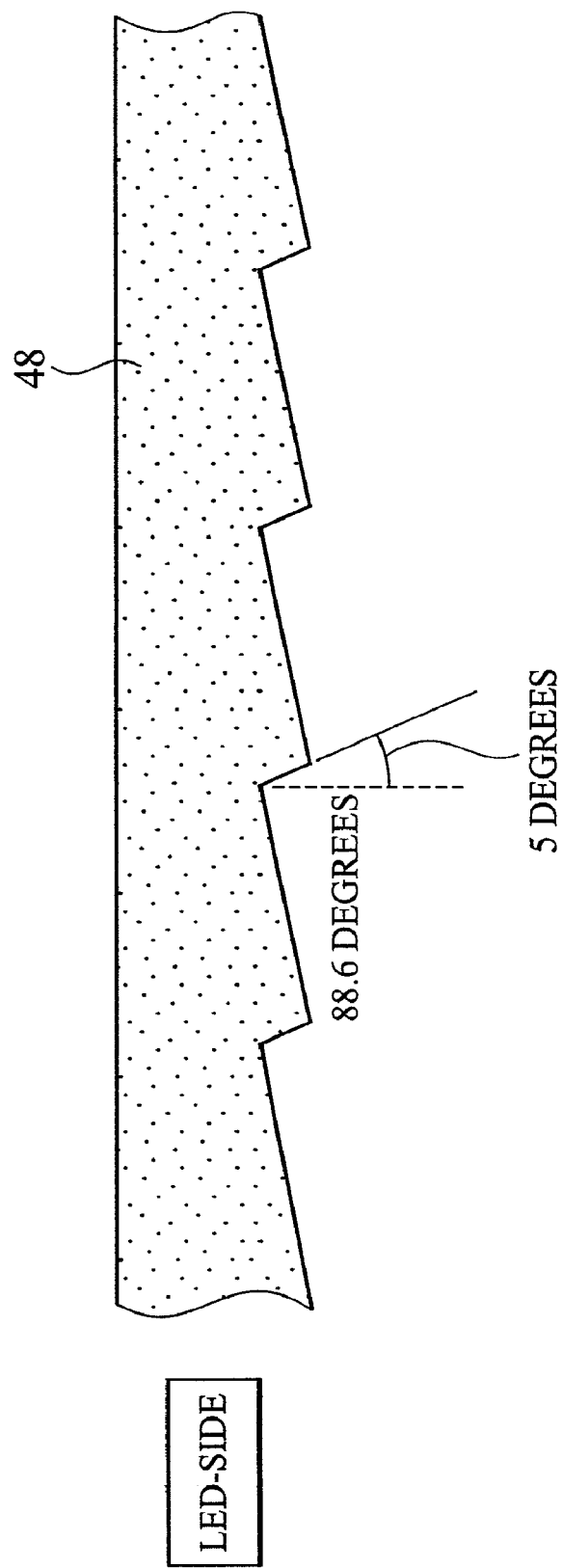
FIG. 11 is a cross-sectional view of a light guide plate.

The light guide plate 48 is produced by an injection molding method using polycarbonate. This light guide plate 48 of a thickness of 0.8 mm has the structure as depicted in FIG. 11, in the rear surface reflective groove, where the period of the groove is random within the range of 120 to 150 μm in order to prevent moire with pixels of the liquid crystal panel. Further, the hologram diffuser 46 formed over the exit surface diffuses light at 60° in a direction parallel to the light incidence end surface 52 (the angle of diffraction at which optical power is half is 60°) and 1° in a direction perpendicular to the light incidence end face surface 52.

The optical hardened resin used for forming the hologram optical element is an ultraviolet curable resin of an acrylic resin base, such as urethane acrylate or epoxy acrylate for example. The form of the diffraction grating of the hologram optical element in FIG. 5 is h=6.2 μm, d=5 μm and u=1 μm.

Figure 12:
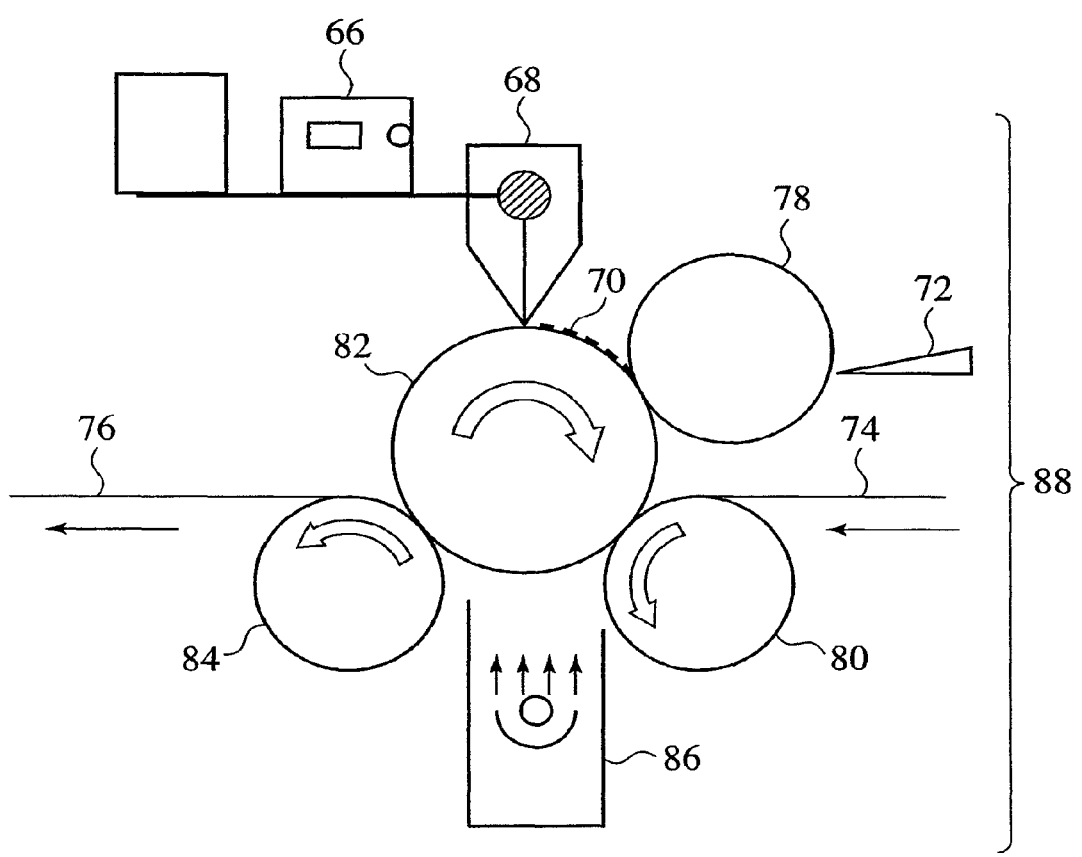
FIG. 12 is a cross-sectional view schematically depicting a device for manufacturing a hologram optical element (diffraction grating)

The production device 88 of the hologram optical element 10 and the production method will now be described. As shown in FIG. 12, in the production device 88 for the hologram optical element 10, resin supply head 68 that supplies optically curable resin 70 is disposed downwardly facing the mold roll 82, while a metering roll 78, nip roll 80, ultraviolet irradiation device 86 and mold release roll 84 are arranged in succession in the downward flow direction of the rotation of the mold roll 82.

Diffraction grating grooves are formed around the surface of the mold roll 82 so as to transfer the diffraction grating grooves to the surface of the optically curable resin 70. The diffraction grating grooves are formed by producing a diamond bit and then forming the grooves on the surface of the mold roll 82 by precision machining with the diamond bit. This mold roll 82 is produced of brass material, and after the grooves are formed with the diamond bit, chrome electroless plating is promptly performed, and the surface is oxidized, glazed and strengthened for mechanical stress. For the embodiments of this invention, a resin product called Sanrad 201 (a product name of a product made by Sanyo Chemical Industries, Ltd.) is used for the optically curable resin 70.

During production the optically curable resin 70 is supplied to the mold roll 82 via a pressure control device 66 and resin supply head 68. As this resin is supplied the pressure at which it is being supplied is detected by a pressure sensor and is controlled by the pressure control device 66, being adjusted to the pressure required for application to the mold roll 82. The film thickness of the optically curable resin applied to the mold roll 82 is adjusted by the metering roll 78. A doctor blade 72 is provided on the metering roll 78 for cuffing of resin adhering to the metering roll 78, thereby ensuring the resin is applied to the mold roll 82 in a stable, uniform condition.

A transparent base film (light passing film) 74 is supplied between the nip roll 80 and the mold roll 82 that are positioned further down flow from the metering roll 78. The transparent base film 74 enters between the nip roll 80 and the mold roll 82, and fits close to the optically curable resin 70. When the film reaches the ultraviolet irradiation device 86 in this condition, with the transparent base film 74 fitted close to the optically curable resin 70, the optically curable resin 70 is hardened by the ultraviolet rays emitted from the ultraviolet irradiation device 86 and the transparent base film 74 sticks fast to the optically curable resin 70 forming an integrated film body, whereafter the integrated film sheet 76 is peeled away from the mold roll 82 by the mold release 84. A long stream of film sheet 76 can be continuously obtained in this way.

The hologram optical element 10 with the film sheet 76 produced in this way cut to the prescribed dimensions is thus obtained. Hologram optical elements (diffraction grating) may be produced by extrusion molding or thermal press processing.

Polyethylene terephthalate (PET) is used for this transparent film base 74 for the embodiments, however, this is offered as an example only and is not restrictive in its application, thus, polycarbonate or acrylic resin, or thermoplastic urethane or the like may also be used. Further, other material, such as acrylic denatured epoxy or acrylic denatured urethane may also be selected for the optically curable resin 70. A metal halide lamp, with a maximum power of 8 kW, was used for the ultraviolet irradiation device 86 light source, and the film sheet delivery speed facilitates production at a rate of 3 m/minute. The delivery speed may be altered according to the characteristics of the hardening of the optically curable resin 70 and the light absorption characteristics of the transparent base film 74, however this can be increased by using a higher wattage metal halide lamp.

Figure 13:
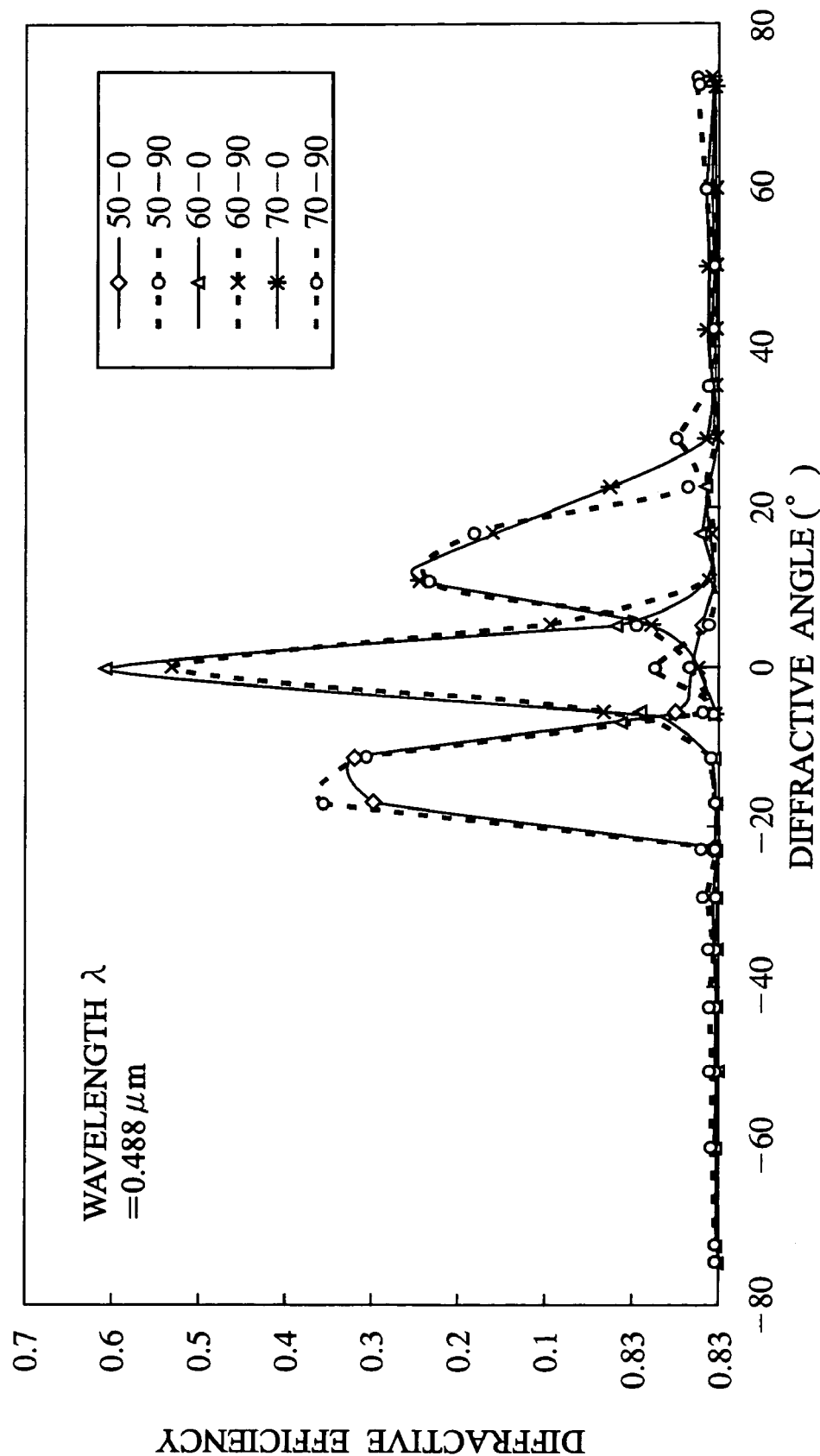
FIG. 13 is a graph illustrating the relationship between diffractive efficiency and angle of diffraction of a hologram optical element (diffraction grating)
Figure 14:
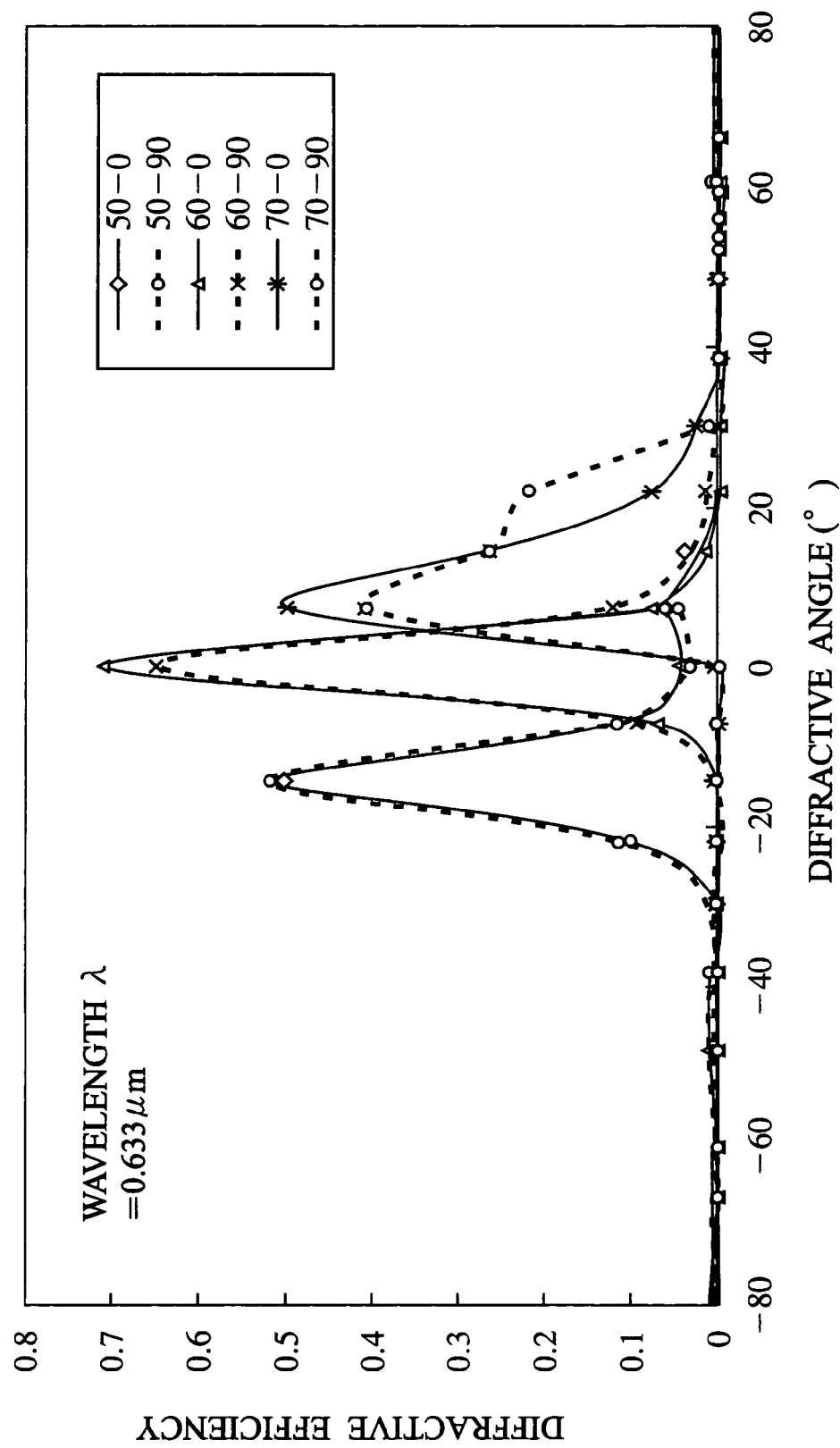
FIG. 14 is a graph illustrating the relationship between diffractive efficiency and angle of diffraction of a hologram optical element (diffraction grating)

The surface of light source device produced in this way has sufficient brightness in the frontal direction and provides an excellent backlight for a liquid crystal display device wherein unevenness due to moire and coloring due to spectral separation are not visible. FIGS. 13 and 14 show the optical characteristics of this hologram optical element (diffraction grating). FIG. 13 relates to a total of six kinds of experiments performed with laser light of a wavelength of 488 nm with angles of incidence set at 50°, 60° and 70°, polarization angles of 0° (P polarized light) and 90° (S polarized light). "50-0" in the legend of FIG. 13 means angle of incidence 50° and polarization angle 0°. On the other hand, FIG. 14 shows the results from the same experiments but with the wavelength at 633 nm. When input at 60° the light is diffracted to a vertical direction of 0° and emitted. Input at 70°, the light travels as it is without 10° shift and distributes largely in a vertical direction, that is to say, the light is diffracted more in a frontal direction. The degree of brightness in the frontal direction can be improved by using this effect.

Figure 15:
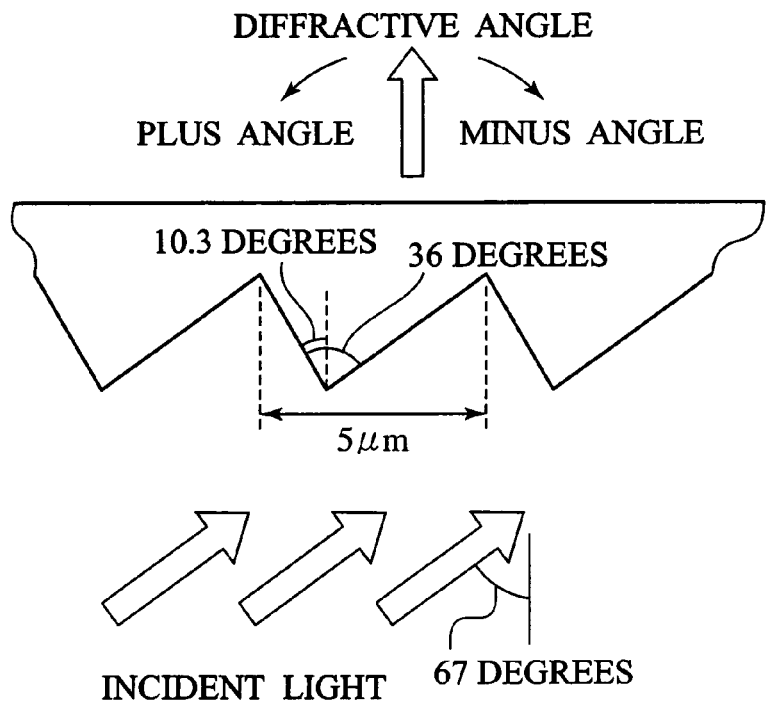
FIG. 15 provides a first example of a hologram optical element (diffraction grating)

FIG. 15 provides a first example of a hologram optical element (diffraction grating).

This first example relates to a hologram optical element according to the second, fourth and eighth embodiments. The hologram optical element 10 is comprised of optically curable acrylic resin having an index of refraction of 1.48, being a sawtooth form grating having a period d=5 µm. When light incident to this hologram optical element at an angle of incidence of 67° is provided in the direction shown in the drawing (light collimated sufficiently close to parallel light), the results obtained are as displayed in the following Table 1.

TABLE 1

| Wavelength (µm) | Maximum order of diffractive efficiency | Angle of diffraction |
|---|---|---|
| 0.48 | 9 | −2.3° |
| 0.55 | 8 | −3.2° |
| 0.62 | 7 | −3.0° |

Figure 16:
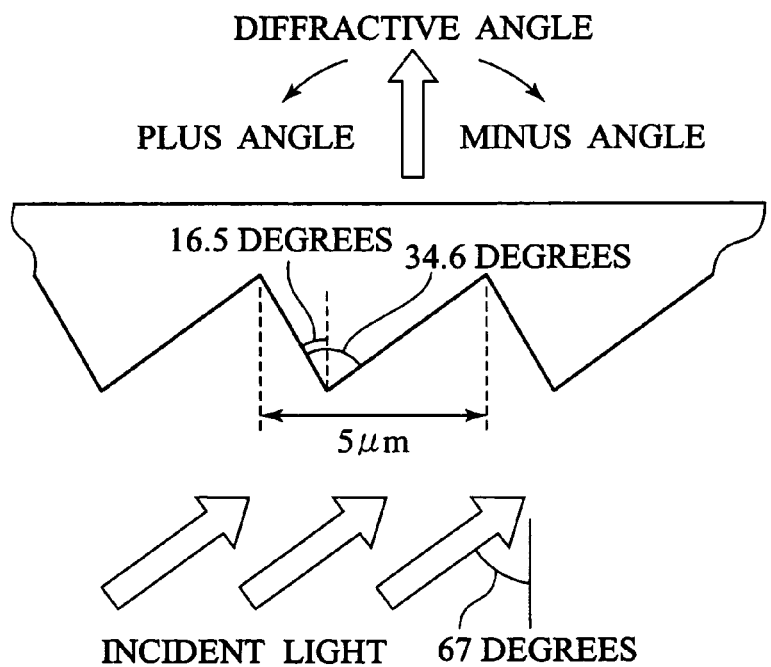
FIG. 16 provides a second example of a hologram optical element (diffraction grating).

FIG. 16 provides a cross-sectional view of a second example of a hologram optical element that is a transmitting diffraction grating.

This second example corresponds to the hologram optical elements according to the second and the eighth embodiments. This hologram optical element 10 comprises an optically curable acrylic resin having an index of refraction of 1.48, and is a sawtooth form grating having period d=5 µm. When incident light (light collimated sufficiently close to parallel light) enters the hologram optical element in the direction shown in the drawing at an angle of incidence of 67°, the results obtained are as displayed in the following Table 2.

TABLE 2

| Wavelength (µm) | Maximum order of diffractive efficiency | Angle of diffraction |
|---|---|---|
| 0.48 | 9 | −2.3° |
|  | 10 | +2.3° |
| 0.55 | 8 | −3.2° |
| 0.62 | 7 | −3.0° |
|  | 8 | +4.1° |

In this second example 9th order and 10th order light of wavelength 0.48 µm have approximately equivalent diffractive efficiency, while 7th order and 8th order light of wavelength 0.62 µm have approximately equivalent diffractive efficiency.

A backlight comprising the first example or the second example of these hologram optical elements that are transmitting diffraction gratings combined with a light guide plate according to the above described embodiments realizes a sufficient degree of brightness in the frontal direction and does not allow coloring due to spectral separation to be seen.

As described, the hologram optical elements according to the present invention control light emission by multiple interference of diffracted light that has passed a plurality of contoured forms, thus, in comparison to a conventional prism sheet, the handling and processing of these hologram optical elements is easier, moreover light emissions are not adversely affected even if one of the contours is damaged or foreign matter is present. Further, the hologram optical elements according to the present invention realize simultaneously, a high rate of light transmittance and a thin form. Using such a hologram optical element in a surface light source device, enables prevention of spectral separation in white light incident from an oblique direction and enables this light to be efficiently bent to a vertical direction and emitted, thereby enabling a higher degree of brightness in a frontal direction to be realized.

The invention claimed is:

1. A hologram optical element having a light emitting surface, wherein a hologram consisting of a transmitting diffraction grating is provided on the light emitting surface, and wherein at the angle at which light is bent the hologram optical element has a low degree of wavelength dependency, spectral separation in white light incident thereto from an oblique direction is prevented, and the light is bent to a normal direction to the light emitting surface and emitted, said hologram optical element consisting of only a single film or panel, said single film or panel having said light emitting surface.

2. The hologram optical element according to claim 1 wherein said transmitting diffraction grating is structured such that, when light of wavelengths λ1, λ2 and λ3 within the range 0.46≦λ1≦0.50 µm, 0.53≦λ2≦0.57 µm, 0.60≦λ3≦0.64 µm is incident at angle θi, the angle θi being an angle to a line normal to the light emitting surface, the maximum diffraction angle for diffractive efficiency of each wavelength is within the range from −5 degrees to +5 degrees, 0 degrees being normal to the light emitting surface.

3. The hologram optical element according to claim 2, wherein λ1 is 0.48 µm, λ2 is 0.55 µm and λ3 is 0.62 µm.

4. The hologram optical element according to claim 1 being a transmitting diffraction grating in which, when light of three wavelengths λ1, λ2 and λ3 that are within the range 0.46≦λ1≦0.50 µm, 0.53≦λ2≦0.57 µm, and 0.60≦λ3≦0.64 µm is incident at angle θi, the maximum order of diffraction for diffractive efficiency of each wavelength is (m+m0), m, (m−m0) (provided that m0=1, 2, . . . ), wherein m is within the range that fulfills expression (1) and expression (2) following, and average period d fulfills expression (3):

$$m\times\{\lambda2\times(1-\sin\delta/\sin\theta i)-\lambda1\}\leq m0\times\lambda1\leq m\times\{\lambda2\times(1+\sin\delta/\sin\theta i)-\lambda1\}, \quad (1)$$

$$m\times\{\lambda3-\lambda2\times(1+\sin\delta/\sin\theta i)\}\leq m0\times\lambda3\leq m\times\{\lambda3-\lambda2\times(1-\sin\delta/\sin\theta i)\}, \quad (2)$$

(Where δ is within the range, 0≦δ≦5 (degrees)) and $$d=m\times\lambda2/\sin\theta i \quad (3).$$

5. The hologram optical element according to claim 1 wherein the cross-sectional form of the grating is a sawtooth form, in which the lengths of the two sides (edges) intersecting at the teeth ends differs by 10% or more, and the interior angle is equal to or below 60°.

6. The hologram optical element according to claim 5 wherein the cross-sectional form of the grating of the hologram optical element approximates a stair like form of N levels (N=4, 5, 6, 7, 8, ...).

7. The hologram optical elements according to claim 5, being a transmitting diffraction grating, formed of material having a refractive index n, where the average depth h of the grating grooves is, h=α×d/(n−1) (0.4≦α≦1.0, d being the average period of the diffraction grating).

8. The hologram optical elements according to claim 1, being a diffraction grating wherein a grating groove is formed as an arc shaped form.

9. The hologram optical elements according to claim 1, being a transmitting diffraction grating used for bending white light for which the angle of incidence θi is in the visible regions 60°±15°, in a vertical direction, having a sawtooth form such that, when m1, m2=1, 2, 3 ..., average period d is m1×(6.0 ±2.0) μm, average depth h is m2×(5.0±1.0) μm, or this sawtooth form has a surface form approximating N level (N=4, 5, 6, 7, 8, ...).

10. The hologram optical elements according to claim 1 wherein a membrane having polarized light separating functionality, color separating functionality or reflection preventing functionality is disposed in proximity thereto or disposed on the front and rear thereof.

11. A hologram optical element wherein the polarized light separation, color separation and reflection prevention functionality of claim 10, is provided by a grating of a relief form having a period of equal to or below 0.6 μm and a depth equal to or below 0.5 μm.

12. A surface light source device wherein the hologram optical elements according to claim 1 is arranged above the light emitting surface of the surface light source.

13. The surface light source device according to claim 12 wherein, if the hologram optical element is not provided, the light is emitted in a range of angles from 20° to 70° in relation to the normal of the light emitting surface of the light source, and if the hologram optical element is provided, 70% or preferably more than 70% of all light emitted from the light source is emitted in a range of angles from −10° to +10° in relation to the normal of the light emitting surface of the light source.

14. The surface light source device according to claim 12 that employs a diffuser in addition to the hologram optical element.

15. The surface light source device according to claim 14 Wherein the diffuser is a hologram diffuser that diffuses incident light within a determined range of angles in space.

16. The light source device according to claim 15 wherein the hologram diffuser is formed as an integrated body with the light emitting surface of a light guide plate.

17. The light source device according to claim 12 wherein a reflection preventing membrane is arranged over the light emitting surface of the hologram optical element.

18. The surface light source device according to claim 12 wherein a film for polarized light or wavelength selection is also provided.

19. The surface light source device according to claim 12 being a light source disposed in contact with the end surface at one side of the light guide plate, wherein the rear surface of the light guide plate has formed thereon a plurality of grooves, almost vertical to the inclination of light propagated in the plate.

20. The surface light source device according to claim 12 wherein the angle of light incident to the hologram optical element is in the vicinity of the Brewster angle, and polarized light of determined directions in light emitted from the hologram optical element is strengthened.

21. The hologram optical element according to claim 1 which directs light entering thereinto from an oblique direction, via a light incident surface of said single film or panel, to exit therefrom, from the light emitting surface, in the normal direction to the light emitting surface, said light incident surface being a surface of said single film or panel opposite to the light emitting surface of the single film or panel.

22. The hologram optical element according to claim 1 which controls light emission by multiple interference of diffracted light that has passed a plurality of contoured forms.

* * * * *